United States Patent
Gu et al.

(10) Patent No.: US 7,292,251 B1
(45) Date of Patent: Nov. 6, 2007

(54) VIRTUAL TELEMICROSCOPE

(75) Inventors: Jiang Gu, Mobile, AL (US); Virginia M. Anderson, Rumson, NJ (US)

(73) Assignee: The Research Foundation of State University of New York, Albany, NY (US)

( * ) Notice: Subject to any disclaimer, the term of this patent is extended or adjusted under 35 U.S.C. 154(b) by 35 days.

(21) Appl. No.: 10/089,854

(22) PCT Filed: Oct. 6, 2000

(86) PCT No.: PCT/US00/27681

§ 371 (c)(1),
(2), (4) Date: Oct. 7, 2002

(87) PCT Pub. No.: WO01/26541

PCT Pub. Date: Apr. 19, 2001

(51) Int. Cl.
  G06T 9/00       (2006.01)
  G06K 9/00       (2006.01)
  G06K 9/36       (2006.01)
(52) U.S. Cl. .................. 345/555; 382/128; 382/232
(58) Field of Classification Search .............. 600/435; 382/132, 128, 130, 133, 232; 345/168, 555
  See application file for complete search history.

(56) References Cited

U.S. PATENT DOCUMENTS

| | | | |
|---|---|---|---|
| 5,216,596 | A | 6/1993 | Weinstein |
| 5,542,003 | A | 7/1996 | Wofford |
| 5,793,969 | A | 8/1998 | Kamentsky et al. |
| 5,891,035 | A | 4/1999 | Wood et al. |
| 5,893,095 | A | 4/1999 | Jain et al. |

(Continued)

FOREIGN PATENT DOCUMENTS

| | | |
|---|---|---|
| JP | 11133311 A | 5/1999 |

(Continued)

OTHER PUBLICATIONS

A Communication from the European Patent Office mailed on Jan. 26, 2006 for Appl. No. 00968822.7-2305 (PCT/US0027681).

*Primary Examiner*—Kee M. Tung
*Assistant Examiner*—Hau H Nguyen
(74) *Attorney, Agent, or Firm*—Morgan & Finnegan, LLP

(57) ABSTRACT

A method and system that uses a computer system as a telemicroscope. A plurality of images of a specimen are captured (Digital camera scanner video camera). The images correspond to the entire specimen and a plurality of segments of the specimen (Multiple linked images). The high-resolution images corresponding to said plurality of segments have different magnification levels and locations (magnifying glass effect); a linking map is generated between said images (Multiple linked images). The linking map comprises information regarding geographical location of the images in relation to the specimen's structure (Image geographical measurement); and images and said linking map are transmitted to a remote user via a computer network thereby allowing the user to view the images with different magnification levels without compromising in image clarity (Computer station one and computer station two). The transmitted images are viewed in a dynamic manner, permitting the user to navigate, enlarge, measure, compare, annotate and exam the digitized images on a virtual slides displayed on a computer screen (Image analysis measurement). The operation of the system closely mimics that of a light microscope.

64 Claims, 21 Drawing Sheets

Principle of the Virtual Telemicroscope System

U.S. PATENT DOCUMENTS

| | | |
|---|---|---|
| 5,933,519 A | 8/1999 | Lee et al. |
| 5,954,650 A | 9/1999 | Saito et al. |
| 6,031,930 A * | 2/2000 | Bacus et al. ................ 382/133 |
| 6,055,095 A * | 4/2000 | Bawolek ..................... 359/350 |
| 6,101,265 A * | 8/2000 | Bacus et al. ................ 382/133 |
| 6,226,392 B1 * | 5/2001 | Bacus et al. ................ 382/128 |
| 6,272,235 B1 * | 8/2001 | Bacus et al. ................ 382/133 |
| 6,404,906 B2 * | 6/2002 | Bacus et al. ................ 382/128 |
| 6,560,339 B1 * | 5/2003 | Iwamura ..................... 380/201 |

FOREIGN PATENT DOCUMENTS

| | | |
|---|---|---|
| WO | WO 9801999 A | 1/1998 |
| WO | WO 9930264 A | 6/1999 |

* cited by examiner

Hardware setup of the VT system

Magnifying Glass Effect Flowchart:

Reference/Comparison Flowchart:

Run Communication Software Flowchart:

VIRTUAL TELEMICROSCOPE

BACKGROUND OF THE INVENTION

This invention is related to a "Virtual Telemicroscope" (VT) system and, more particularly, to a method and system for using a computer system as a telemicroscope.

Telepathology is a field that combines the disciplines of pathology, computer science and telecommunication. It captures, digitizes, transmits, displays and manipulates pathological and medical images for the purpose of analysis, consultation, collaboration, diagnosis; training and standardization. Compared with conventional pathology, telepathology is more efficient, economical and flexible. It enables medical image evaluation to be performed at any location, any time, as long as the evaluator has access to a computer with adequate network connection.

The history of telemedicine and telepathology goes back to the early days of computer science and telecommunication, and its progress has paralleled the advancement of these two fields. Physicians have long been experimenting with the idea of delivering medical service to distant locations by means of telecommunication.

Telemedicine has come a long way. Certain disciplines, such as teleradiology, have been successfully implemented in many hospitals throughout the world. However, telepathology and telemedicine face a number of obstacles. These include computer speed and capacity, programming techniques, compression strategy, network transmission bandwidth, the way the images are displayed and manipulated, physicians' and technicians' training, as well as administrative issues such as medical licensing, legality, payment, medical insurance, patient privacy, etc.

In addition, for telepathology in particular, much of the resistance to these new technologies from the pathology community has been that the microscopic images have been handled and viewed in a way that is very different from the traditional manner in which the cases are evaluated. The transmitted images are usually static, isolated, and often represent only portions of the entire tissue section. The pathologists frequently hesitate in making any pathologic diagnosis based on the computer images of a partial tissue section displayed in an unfamiliar manner. When the entire specimen is digitized, the process takes a considerable amount of time (a few hours), involving specially designed and expensive automatic microscopic equipment and lengthy scanning steps. This, together with the limited computer capacity, the relatively narrow transmission bandwidth and the very high cost, has hindered the practical value of this potentially very useful technology up to the present day.

With the recent development of fast computers, wide band transmission network and new programming technology, this situation is rapidly changing. This VT system takes advantage of recent advancements and overcomes some of the major technical obstacles in telepathology. It aims to popularize this technology with a new approach.

In an international conference on telepathology on Dec. 3-5, 1996, leading experts in the field of telepathology agreed that at sufficient resolution, the digitized computer images can be adequate for pathological diagnosis and consultation. There are systems for similar Purposes. However, no practical system was available to provide a pathologist with a fill magnified or non-magnified view of the entire specimen and at the same time a desired view of selected portions of the specimen at a different magnification. The available systems rely on remotely controlled microscope and camera and broadband network connection, or lengthy process of digitization of slides, involving cost far beyond the justification of the practical value for most pathologists worldwide.

SUMMARY OF THE INVENTION

In accordance with the invention, there is provided a method and a system of using a computer system as a telemicroscope. Among the exemplary aspect of the invention, a first image corresponding to an area of a specimen is captured with a digital image capturing device; at least one second image corresponding to a selected area of the first image is captured with the digital camera, said second image having a different magnification from the first image; the first and second images are stored in a computer-readable medium; and a linking information map is generated indicating the relationship between said first and second images.

In accordance with another exemplary aspect of the invention, a location for an index file is received from a user, wherein the index file is stored on a computer-readable medium; the index file is retrieved, wherein the index file lists a plurality of image files having an image of a specimen and map information of linked images; the listing of the plurality of image files from the index file are displayed on the monitor screen of the user's computer system; a first file name comprising an image of the entire specimen is received from the user, wherein the first file name is linked to a second file name comprising an image of a selected area of the specimen, wherein said image of said second file name has a different magnification level from the image in said first file name; and the images of said first and second file name are dynamically displayed allowing a user to view the specimen with different magnification levels of the specimen.

In accordance with yet another exemplary aspect of the invention, a plurality of images of a specimen are captured. The images correspond to an area of the specimen and one or more segments of the specimen. The images corresponding to the specimen segments have different magnification levels; a linking map is generated between said segment images. The linking map comprises information regarding geographical location of the images in relation to the specimen's structure; and such images and said linking map are transmitted to a remote user via a computer network, thereby allowing the user to view the specimen image in their entirety and at different areas of the entire images with different magnification levels.

For a complete understanding of the invention, together with its features, details and advantages, reference should be made to the following description of preferred embodiments and drawings.

BRIEF DESCRIPTION OF THE DRAWINGS

FIG. 2(*b*) is a flow chart illustrating the major steps in image retrieval, reviewing and manipulation;

DETAILED DESCRIPTION OF THE INVENTION

1. Basic Principles

The present invention is a new "Virtual Telemicroscope (VT) system", in which images are captured, digitized, arranged, packaged, posted, transmitted, displayed, enlarged, measured and analyzed with a user-friendly software program. It can be used for telepathology, telemedicine, distance learning, remote training, standardized exam and other applications, in which high-resolution images are transmitted and evaluated. This invention enables the users to retrieve and view virtual slides with specimen images and logically linked high-resolution partial images anywhere, any time via the Internet and other computer networks, without involving special and expensive equipment and setup.

Figure 1:
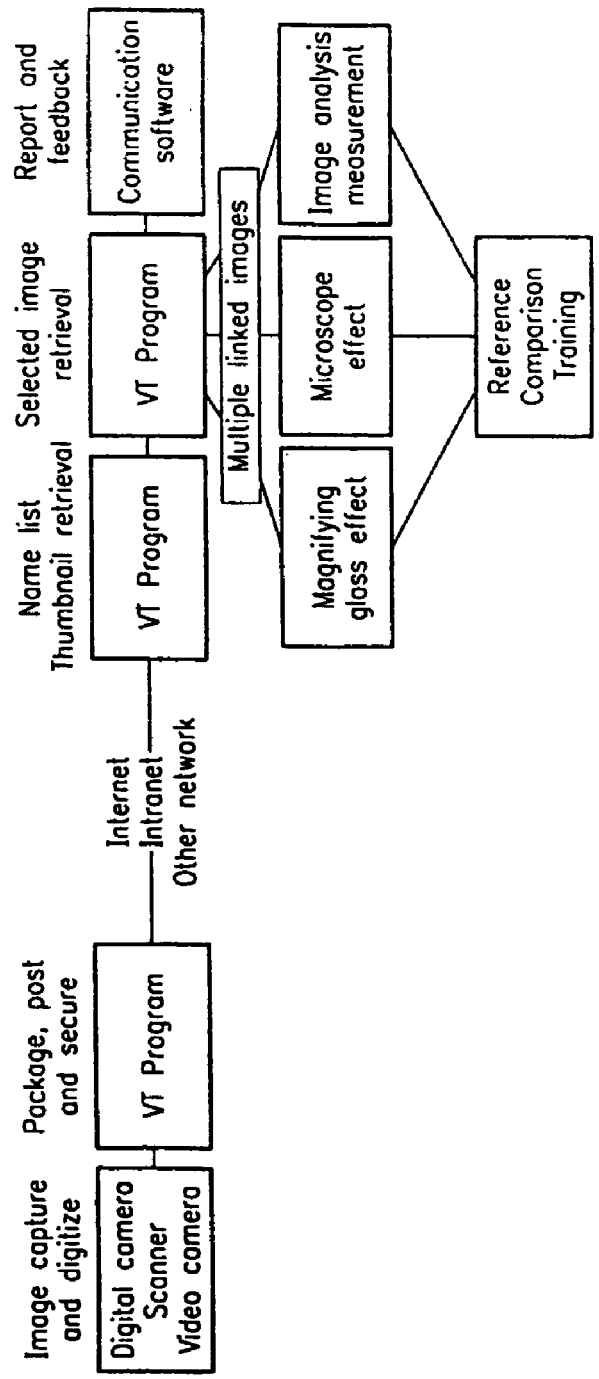
FIG. 1 is a diagram of the functional structure of the VT system according to the present invention.

FIG. 1 shows a functional structure of the VT system according to the present invention, which can be used to create, retrieve and view virtual slides. The basic principle of this system closely mimics that of a light microscope. When a pathologist exams a specimen on a glass slide under a light microscope, he uses a number of objective lens with different magnifications. Each slide is viewed through a fixed magnification. By moving the glass slide on a movable stage, the entire slide is examined.

He usually views the slide with a low-power objective lens first to exam the entire specimen and then switches to a higher-power objective lens to have a closer look at different areas of interests. Essentially, he views static images in a dynamic manner. The VT system works the same way. It captures the image of a entire slide with a high-resolution scanner. Alternatively, a low-power objective lens connected with a digital image capturing device such as digital camera can be used for the image of the entire slide. Subsequently, high-power images are captured for selected areas with several high-power resolution lens with different magnification also connected with the digital image capturing device. The captured images are converted into a digitized images and stored. A link map information is then generated to link the image of the entire slide to the higher-power images. All these images, information concerning their location relative to specimen and magnifications, together with associated text data are then packaged and transmitted to a remote computer accessible by a user.

The remote computer displays the entire slide as a first image and a higher-power close-up views as a second image, as well as an image map that indicates the relationship between the first and second images. The relationship can be one or more of the degree of magnifications, size of the specimen represented by the image location of the selected area of the specimen from which the second image was prepared. The second image can be prepared as many as possible with different selected area and magnifications. The viewer can view different portions of the digitized images and enlarge them to a range of magnifications without loosing any clarity.

In summary, static images of different magnification lens and of corresponding different areas or sections from the same specimen are captured, arranged and packaged. They are then transmitted and viewed by a remote computer in a dynamic way, i.e. the viewers can examine the entire slide and then switch to selected higher-power images for a close-up evaluation. The viewer can also navigate the "virtual" slide in a way very similar to operating a light microscope. In addition, the VT system can perform image measurement, comparison, annotation, etc. and provide functions beyond those provided with a light microscope.

Figure 3:
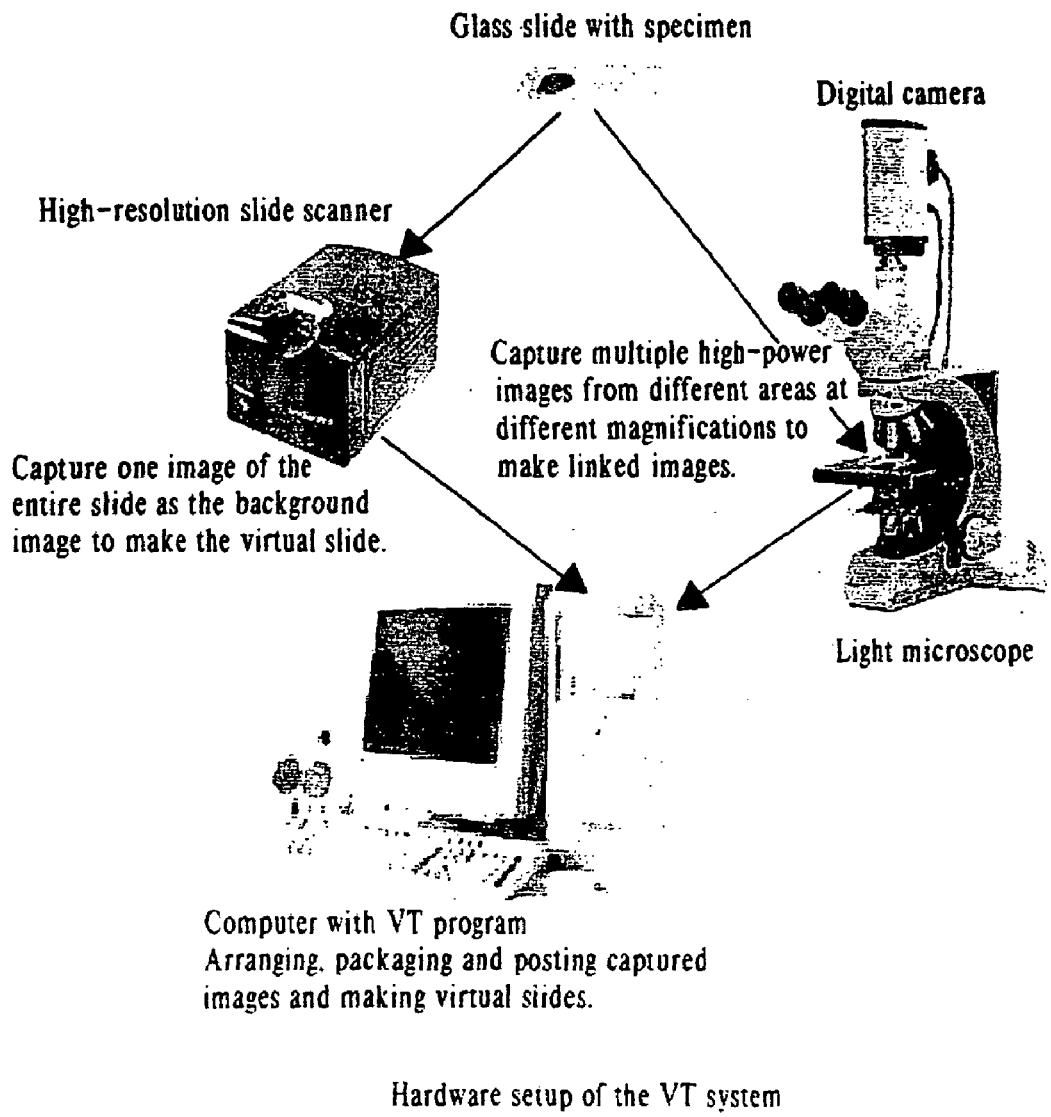
FIG. 3 is a pictorial representations of the hardware set up of a VT system showing the process of image acquisition using a high-resolution scanner, a light microscope with a digital camera and a computer.

FIG. 3 shows pictorially a representative hardware set-up of the VT system. As an example, the following equipment is used; (1) a 166 MHz Pentium II or above class computer with at least 128 MB of RAM installed memory (384 MB recommended), 100 MB of available hard disk space, CD-ROM drive, Color monitor capable of 800×600 resolution (19 inch recommended), Windows 95, 98, NT or 2000, Internet or Intranet connection (broadband connection recommended); (2) a digital camera for a light microscope capable of capturing images of at least 800×600 pixels resolution (1152×864 pixels or higher resolution recommended); (3) a high-resolution slide scanner that can scan standard pathological glass slides at 2700×2700 dpi (4000× 4000 dpi or higher recommended).

FIG. 3 illustrates the process of image acquisition using a high-resolution scanner, a light microscope with a digital camera and a computer. An image of the entire specimen is first captured with a high-resolution slide scanner or a light microscope using an objective lens at a very low magnification. This image of the entire specimen slide is used as the background image of the virtual slide. Higher-power images are then captured with the microscope and the digital camera from different areas of the same specimen using different objective lenses. All acquired images are saved in a folder containing logically-related image data in a computer. The VT program packages them into a virtual slide for transmission and viewing.

The VT system can be divided into the following six operational stages: acquire images, package images, transmit and retrieve images, display images, manipulate images and provide information feedback. Physically, the VT system comprises a memory unit and processing unit. The processing unit is in communication with the memory unit and is configured by the processor to perform such functions as capturing and storing images, generating and storing a link map between the images and transmitting the stored information to other users at remote computers through computer network.

As noted above, an image of the entire specimen on the glass slide is captured with a high-resolution scanner or, alternatively a digital camera and light microscope equipped with a low-power objective lens. This image is usually very large in size, much more than the usual computer screen size (800×600 pixels). Then, areas of interests from the same glass slide will be captured with a digital camera linked to a light microscope equipped with higher-power objective lenses. Preferably, additional images will be taken from different specimen areas at different magnifications from the same glass slide. All these images are captured in sizes equal to or larger than 800×600 pixels and saved in JPG format into the data file folder in the computer. Additional slides can be prepared in the same manner.

The VT program packages these saved images for transmission or posting. This is achieved by using the first image (the image of the entire specimen) as a background map and arranging all the other images taken from the same slide against this background. These images (as thumbnails) are digitally placed on the background map and positioned at the locations where they were captured. Their sizes will also be digitally adjusted to reflect their magnifications, i.e., the higher the magnification, the smaller the area they will cover on the background map.

Information including the images themselves, the locations and the image sizes, together with associated text data is saved and packaged into an index file. At this point, the VT program makes small thumbnail images of all the large images. The image files and the index file will then be posted on a computer server or sent to the receiver via email attachment. This completes the task for image preparation at the sending side of the system.

On the receiving side, a remote viewers will open up the VT program on his/her computer system and enter the complete address where the packaged images are posted. By clicking the "retrieving" button or the "enter" key, the VT program will retrieve the file names of the saved images and link information map. The retrieved files are shown as thumbnail images on the screen allowing a user to easily select an image out of several images shown. A thumbnail image on the screen represent a "slide tray" and the screen may can show up to 20 virtual slides simultaneously in an embodiment. The user can then see all the available images as virtual slides on the monitor screen. If the image package is transmitted to the remote computer via an e-mail attachment, the viewer will only need to locate the file on his computer. Once the file name is selected, the packaged images will be called it into the VT program for display.

The user picks any slide displayed on the screen for review by clicking on it. The image of the entire specimen (the one captured with the scanner or the low-power objective lens of the microscope connected with digital camera) will then be downloaded into the user's computer and displayed on the screen. The real size of the image (e.g., 2000×2000 pixel) is much larger than the monitor screen (800×600 pixels). At this point, the program shrinks the large image to fit into the size of the screen so that the reviewer can have a complete view of the entire specimen.

At this point, a viewer has a number of options. The viewer can choose one of the many functions built into the VT system, including evaluating the image with the "magnifying glass function", the "microscope function", the "measurement function", "retrieving text data" associated with the images, and retrieve additional high-power linked images to have a closer look of selected areas of interests from the same specimen. The viewer may also go back to the "virtual slide tray" to select another slide to view, as if working at an office desk with a slide tray and a light microscope. All such functions can be activated by "clicking" on corresponding icons in an automatically hidden toolbar, which is located at the upper margin of the screen.

The principle of the enlargement functions of the VT system is based on the fact that the original sizes of the captured images are very large, much larger than that of the screen size (800×600 pixels). The VT program manipulates the image to show only a portion of it at different ratios of sizes from the original image, and gives the viewers the impression of image enlargement. This is why the enlarged images are always sharp. The degree of enlargement is determined by the original size of the captured image.

In the magnifying glass effect, only a portion of the enlarged image is shown, mimicking the effect of a magnifying glass. In the microscope mode, a small portion of the virtual slide, as defined by a virtual objective lens, is displayed on the entire screen as the viewfinder, closely mimicking the effect of a light microscope.

A viewer can also click an icon to view the availability of the linked higher power images, together with their relative locations and sizes. By clicking on these linked images on the image map, the viewers can selectively evaluate these linked higher power images to have a better appreciation of the detailed structure of the specimen.

By selecting different icons in the toolbar, viewers can also perform line measurement of images, view associated text files, compare one image with other images in an established image database, and view the help file. The viewers can exit the program by clicking the "quit" button at any time.

The basic functional organization of the VT system is illustrated in FIG. 1. The different steps involved in operating of the VT system is presented in FIGS. 2a, 2b. The logical steps of the computer program are presented in the flow chart of FIG. 11. Details of each aspect of the system are described below.

2. Image Acquisition

A pathological tissue section is first converted into a digital image by capturing with a digital microscopic camera or a high-resolution scanner. In either case, the entire pathological image can be digitized. The basic functional relationship among the slide scanner, the digital camera and computer in capturing the images is illustrated in FIG. 3.

Depending on the objective lens used on the microscope, the entire image may be captured with one exposure or with a series of exposures of the tissue section and then a complete image formed by pasting multiple images together with software to make a seamless mosaic image. The low-power overview image also can be obtained with microscopic objectives at very low magnification.

Generally, it is easier to capture the image of the entire specimen with a high-resolution scanner. Currently, the highest resolution for a small area glass slide scanner is about 4000×4000 dpi. For a 0.5×0.5 inch tissue section, this will generate an image of about 2000×2000 pixels in size. When displayed on a computer monitor at 800×600 pixels with a 19-inch diagonal displaying area, this represents a real enlargement of the original sample at about 100-150 times.

On a computer monitor with a display capacity of 0.26-0.28 mm resolution, images at their real size can be further stretched 1.5 times without losing any visible resolution. When stretched beyond this magnitude, the quality of the image begins to deteriorate, and this may affect the accuracy of the pathologists' evaluation of the images. Therefore, with a high-resolution scanner, a tissue section can be effectively enlarged up to about 200 times from the original size without any visible distortion of the original image. This would magnify a typical human neutrophil (originally at about 15 um in diameter) to about 3-4 mm in diameter, enough to display microscopic patterns of cellular arrangement for most pathological cases. Slide scanner at other resolutions can also be used. However, the final size of the captured image preferably should be equal to or larger than 800×600 pixels.

Once the entire specimen is captured, one can further capture a number of high-resolution images from different areas of interest from the same slide using microscopic objective lens of higher magnifications. Each image should have the resolution of at least 800×600 pixels, preferably higher. These images can be arranged, linked and packaged together with the low-power image captured previously.

They will be transmitted collectively and viewed at the receiving end in a meaningful way to make sense of each high-power image in relation to each other and to the low-power image as the background. This will greatly enhance the effectiveness of image viewing by the remote computer. At the same time, this approach will save the user from capturing the entire slide with high-power objective lens, which consumes time and storage space and slows the entire process to an impractical level.

Once captured, the digital images can be saved into jpg, gif, tif or bmp file format. Depending on the file format, the file size of each high-resolution image varies, from less than one megabyte to several megabytes. To facilitate fast network transmission, it is recommended that the images be saved as jpg files with about 50% compression. We have determined, through experiments and consultation with other pathologists, that at this rate of compression, there is no noticeable loss of image clarity. Further compression may be possible for different types of files. These images can be stored in any folder and drive, portable or fixed, in a computer for further packaging, posting and transmission.

3. Image Preparation, Packaging and Posting

Figure 2A:
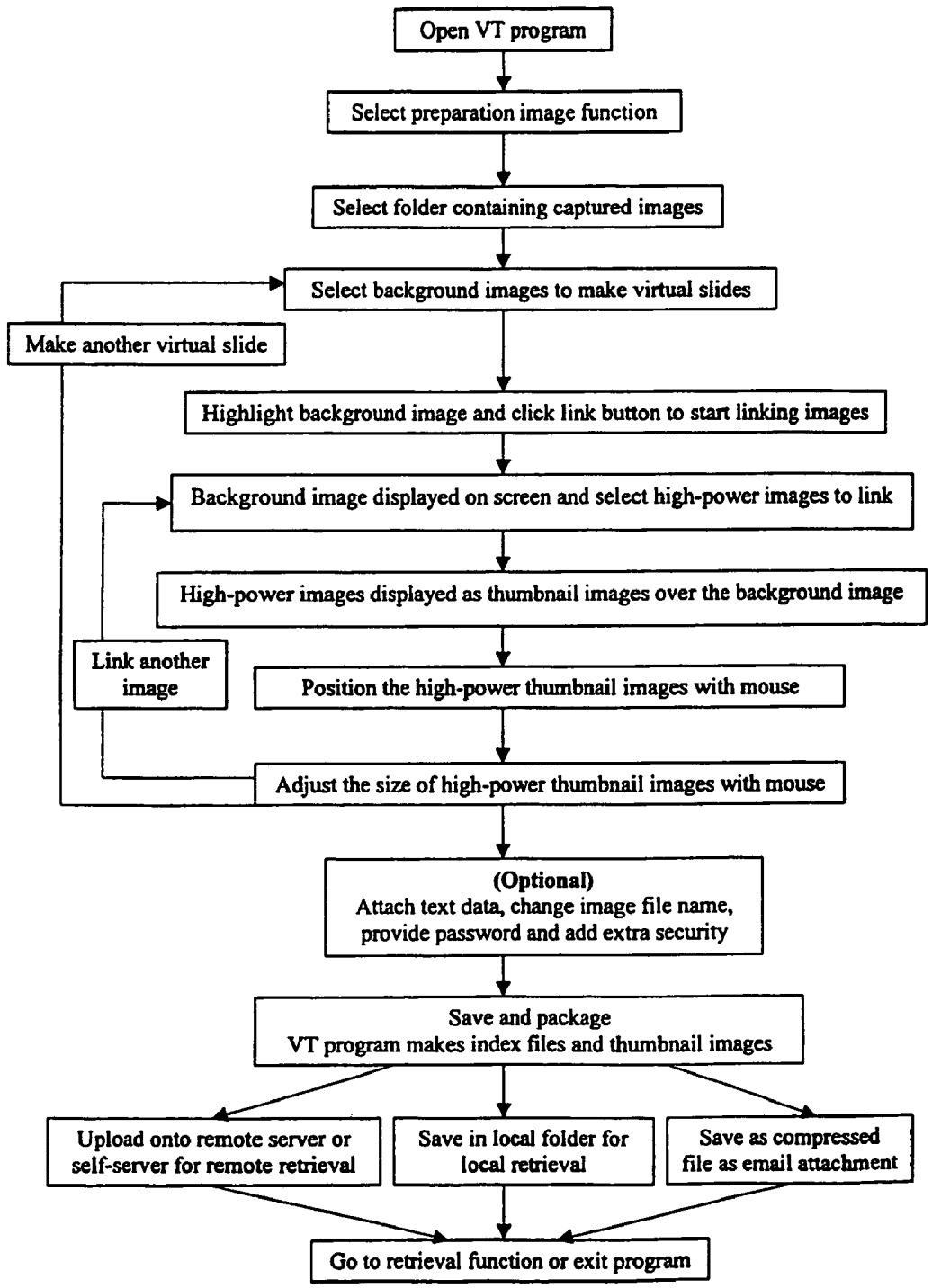
FIG. 2(*a*) is a flowchart illustrating the major steps in image arrangement, packaging and posting.

The captured images need to be arranged, packaged and saved into designated folders. FIG. 2a shows the major steps of image arrangement, packaging and posting. These packaged and saved files can be posted in a server (on a remote computer or the same computer) for remote retrieval, or in the same computer for local retrieval. The packaged images can also be compressed and attached with an email and sent to any email addresses. The VT program installed in a remote computer can open the email-attached files. This approach will bypass the need to have a computer server at the sending end and make it available to most pathologists and users. The viewing functions of the VT program are the same no matter how the image package is transmitted or retrieved.

If a server is used, the package is posted in certain designated folder that will make the packaged images available for retrieval by the Virtual Telemicroscope program located in the same or remote computers. The remote computers may be stationed across rooms, across nations or across continents, and connected by a network (local area network, Intranet or Internet). One set of packaged images can be retrieved and viewed by unlimited number of computers simultaneously. This feature facilitates online learning, online examination, collaboration, consultation, discussion and standardization.

Figure 4A:
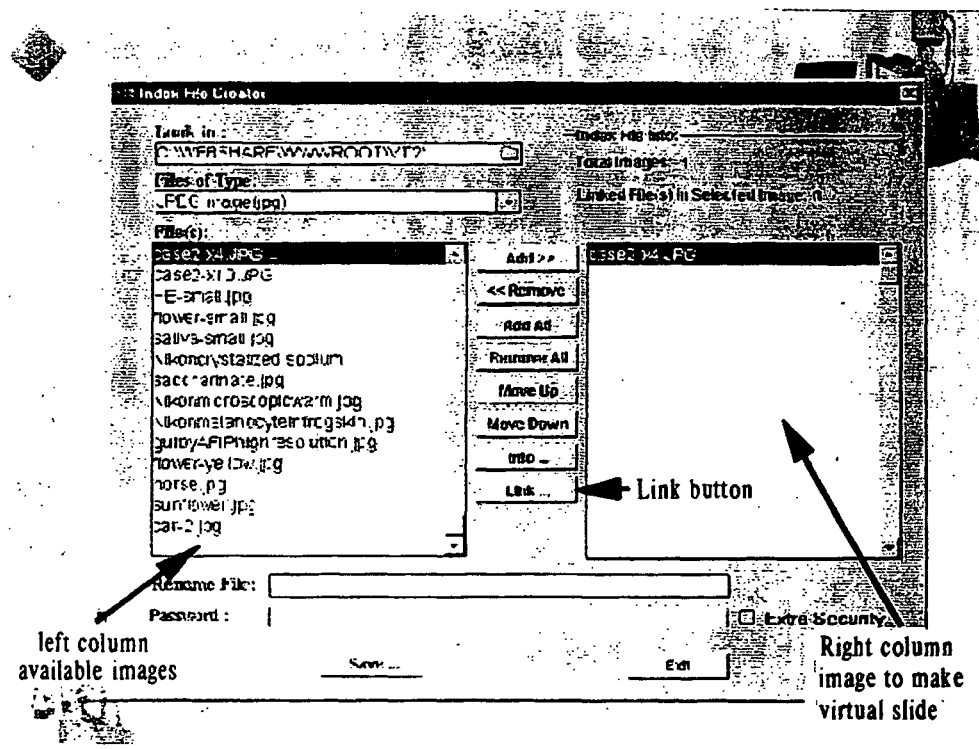
FIGS. 4*a*, 4*b* are screen views of image arrangement, linkage, and packaging. The image selection view (FIG. 4*a*). The image link and arrangement view (FIG. 4*b*)

The packaging function is achieved by grouping and arranging all the images captured from the same glass slide together and record their locations and magnifications. By clicking on the "prepare image" button, a dialogue window of file directory is opened with two columns and a number of function buttons at the middle as shown in FIG. 4a. The image selection window contains two columns with function buttons in the middle. The left column displays available images for packaging. The right column displays images to be made into virtual slide.

The users can navigate through the file directory and identify the previously captured images. Once the folder is selected, file names of all the relevant image files will displayed in the left column. The users can then select the image files to be used as the background images (the ones captures with the slide scanner or the low power objective lens) and add them to the right column for further packaging and processing.

The images of up to 20 different slides can be comfortably processed and presented in a virtual slide tray for the viewer to view. Each of the twenty images can be linked and packaged to additional 20 higher power images taken from the same slide to give the viewers the option to have a closer exam of selected areas at higher magnifications. This linking and packaging function of the VT system is described below.

A unique feature of this system is that it can arrange a number of images at different magnifications taken from different areas of the same tissue sample and relate them to a background low magnification image in a way that the geographic relationship among the different images and their relative magnifications are recorded, transmitted and displayed.

This feature enables the viewers to use a low-power image of the entire slide as the background and link up to 20 higher-power images (this number can be increased if needed) of different areas to the same background. Each linked image can be positioned and sized on the background to reflect the location and area from where it is taken. This allows the senders and the viewers to appreciate the relationship among the different images taken from the same slide and greatly enhance the easiness for the reviewers to view and analyze the entire specimen.

Figure 4B:
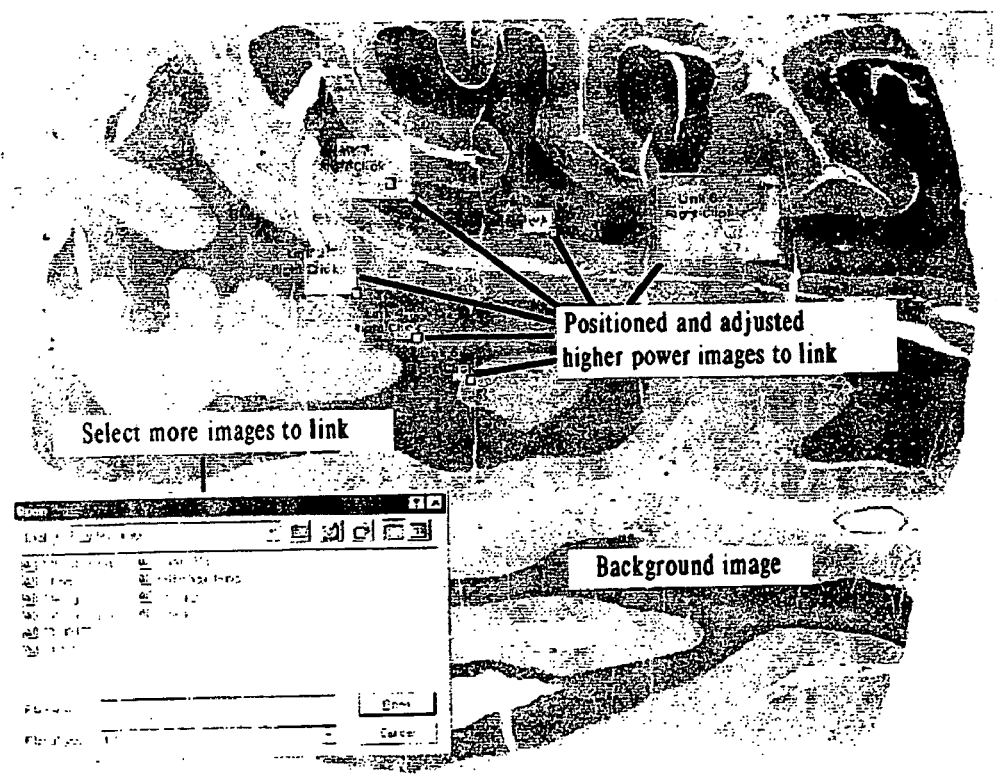

The linkage and package of multiple images taken from the same glass slide is achieved as following. First the file name of the background image is selected and then click on the button of "link". The selected background image is then displayed on the screen. At this time another file directory window is opened and the users will select the image files to be linked to the background image. When all the higher-power images to be linked to the background image are selected, they will be displayed at the margin of the background image as small thumbnail images as shown in FIG. 4b. The image linkage window contains the entire background image and many higher power images to be linked to the background image. These higher power images are displayed as smaller thumbnail images over the background and their positions can be moved and sizes readjusted with the mouse by the user to create a linked image package within the virtual slide. Their positions and sizes should correlate to the areas from which they were captured and the ranges of sizes they cover. All these information and the images will be packaged and transmitted. They can then be displayed faithfully in remote computers using the VT program.

The users can then drag and drop each image onto the background and position it to the appropriate location where it was captured. The users will then resize the images by dragging one corner of the linked images and shrink or enlarge them to appropriate sizes in relation to the background image, covering an area equivalent to the viewfinder sizes of the objective lens used in capturing these images. All the linked images are arranged against the background image in the same fashion. The entire package will then be saved. All the images, together with their locations and sizes and relationship to each other, will be recorded in the index file and transmitted to the remote computer for display.

During image packaging, the VT program also offer the possibility for the user to annotate the images by putting arrows, circles, rectangles, lines and words on the images. These marking can be recorded and transmitted to the retrieving computer and displayed by clicking an icon in the toolbar.

During image preparation and posting, the Virtual Telemicroscope program makes copies of the original digitized images and stores them in the designated folder on the server (a remote server or the local computer if it is used as its own server). Simultaneously, the VT program automatically creates an index file that compiles the file names or given names for each image. This file is saved as a Director (Macromedia Inc. San Francisco, Calif., USA) cast file with an "cct", "cst" or "txt" extension. The former file format is protected that can not be opened or modified by a third party.

The VT program will also make thumbnail image from each high-resolution image and store them with the index file for retrieval. During image retrieval, the remote computer can access the designated folder to read this particular index file using the VT program, and display the available images on the remote computer. The images are first displayed as thumbnail images with complete file path and names in a virtual slide tray, resembling the glass slide tray used in routine pathology laboratories. One virtual slide tray can hold up to 20 slides. The viewer can retrieve slide trays one at a time and there is no limit to how many slide tray can be posted and retrieved. These slide trays can also be retrieved and displayed by the same computer where the files are stored. All these functions are performed in the background and are transparent to the users. All the viewers have to do is to enter the path or URL of the folder location, with a click of a button (the retrieval button), or a press of a key (the enter key); the virtual slides will be displayed on the monitor screen almost instantly.

When the packaged images are stored in the same computer, or transmitted as an email attachment, the user will first need to locate these files by clicking the "open file" icon next to the location window. A file directory window will open and allow the user to identify the packaged files. Once selected, the packaged images will be displayed in the screen in the same way as for the retrieved image packages.

The dialogue window for image preparation and posting also calls for optional attachment of data files of related information concerning the image. These can be patients' information, notes from the sender, specific requests, etc. Notes can be entered and files can be attached at this time. They will be stored under the same names as the image files but with different file extensions. These files are retrieved together with their linked image files.

In the dialogue window during image posting, there is also an entry for a password. The users have the option to enter a password to prevent the images from being accessed by unauthorized parties. If the users choose to leave the password window blank, no password will be required when retrieving images.

There is also an option named "extra security". If the use checks this option during image packaging, the images and data will be encrypted to provide extra protection to third party tampering. This option may slow down the speed at which the packaging is processed by the computer.

By clicking the "save" button, all the images and associated information will be packaged and saved into a local directory or a server. All saved image packages become available for local or remote retrieval. This can be achieved by uploading the files onto a remote server, or by using the default computer as the server with the "Personal Web Server" software from Microsoft, Inc. In the latter case, the saved files should be located directly in, or in subfolders of, the path "c:\webshare\wwwroot\", where "C" is the root drive where the Personal Web Server program is installed. The image files are then available for retrieval by remote computers via a network.

4. Security

There are four levels of security for image transfer. First, the retrieval party needs to know the IP address, domain name and the exact path of the image files on the server in order to retrieve the images. This is a lengthy name or a series of numbers or a combination of both. The name(s) of the subfolder(s) can be easily controlled and changed by the server administer, thereby providing the first line of security.

Second, the administrator can move the image files from the designated folders to another location, or change the folder or file names, thus making the folder inaccessible by outside computers. Also, the server computer can be turned off. This will effectively prevent unauthorized user from accessing the files from a remote computer.

Third, the password function is an integrated part of the VT program and can prevent unauthorized users from accessing these image files. Without entering the correct password, the remote computer would not be able to go beyond the first screen even if they have the VT program installed in their computers and know the exact location of these images. The password can be easily changed during image posting. In the event the senders forget the password entered, they can just repost the images with a new password and the old one will be automatically voided as long as the files are saved in the same folder.

Finally the "extra security" function would enhance the security during image storage and transmission.

5. Image Retrieval

Figure 2B:
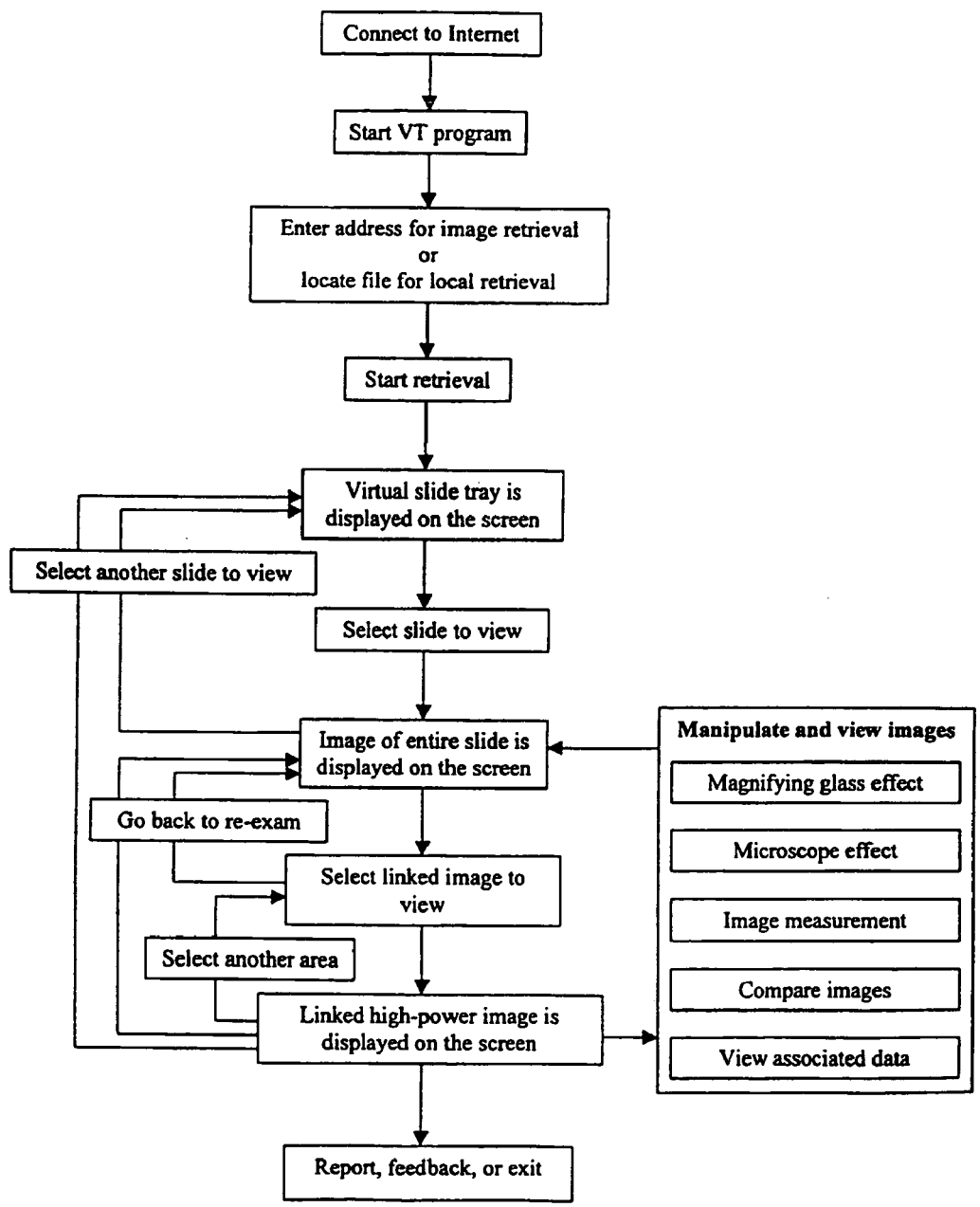

FIG. 2b is a flow chart that explains the image retrieval process. Image retrieval is performed in two steps. First the retrieving computer sends a signal to the server computer to retrieve the names and the thumbnail images in the index file. The users need to enter the correct URL (for remote computers) or file path (for the default computer), and then the correct password in order to have access to this information located in the server computer. This retrieval is achieved via the network by reading the index file compiled by the VT program during image preparation and posting.

The file names and thumbnails, each corresponding to one image file on the server, will be displayed on the remote computer as a virtual slide tray, with up to 20 slide per tray. These thumbnail images and names give the viewers a clear indication of the available images and data for retrieval. This process is completed quickly, as at this stage only the index file and the small thumbnail images are retrieved and displayed, and the relatively large files of images have not been transmitted.

Once this is completed, the remote users can then select the desired slide by clicking on it, and the corresponding image package and related data files will be transferred to the remote computer. Depending on the speed of transmission and the size of the files, this step may take less than a second to several minutes. With broad bandwidth Internet connection (cable, T1, T3, DSL, etc.), this step typically takes less than a few seconds. Once a slide is clicked, the entire background image (the one captured by the high-resolution scanner or the low power objective lens) will be displayed on the screen. At the same time, the linked images and all other linked information for this slide continuously download in the background.

Figure 5:
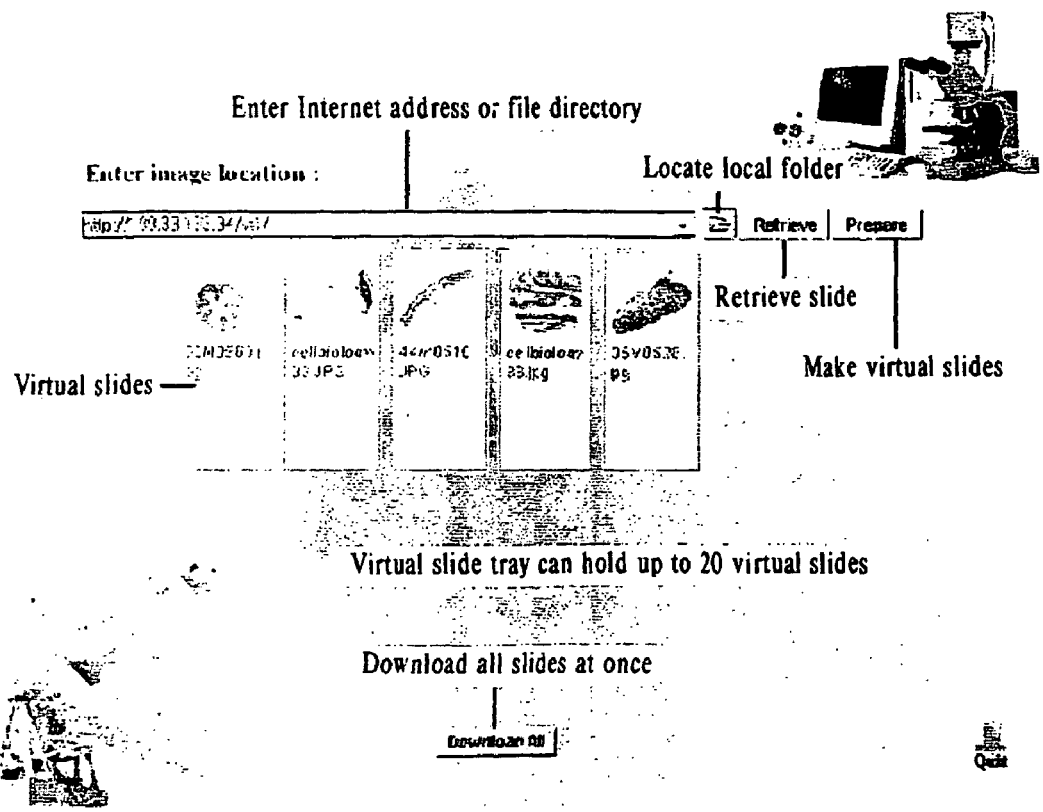
FIG. 5 is a screen view of image retrieval.

A user may also use the "download all" option. Once this button is clicked, all the available images in the slide tray will be downloaded to the user's computer. This process will take longer than download one slide at a time, but will facilitate a faster retrieval and processing speed in subsequent manipulations of the images. FIG. 5 shows an example screen for the image retrieval and shows five virtual slides for selection. The address of the image location on the Internet or local computer should be entered into the address window. The virtual slides will be retrieved and displayed on the screen on a virtual slide tray. Clicking on any slide will retrieve the virtual slide into the computer. The viewer may also select the "download all" option to download all images into the viewing computer at once.

The retrieval program is compiled with the Lingo language within Director 8.0, using the "GetNetThing" command. This function can also be achieved by using other commands with other computer languages.

6. Image Manipulation

Once the image is retrieved, it automatically enters into the internal cast of the VT program and is used as an internal cast number. At the same time, the VT program makes smaller versions of the large, high-resolution images. The smaller images are also entered as internal cast numbers. The original images and their smaller counterparts are then used in the VT program and displayed on the "stage" (the entire visible area of the monitor). For this program the stage is an area of "800×600" pixels displayed at the center of the monitor, and should occupy the entire screen. We recommend that the computer monitor be set at a resolution of 800×600 pixels. It can be higher but not lower.

Figure 6:
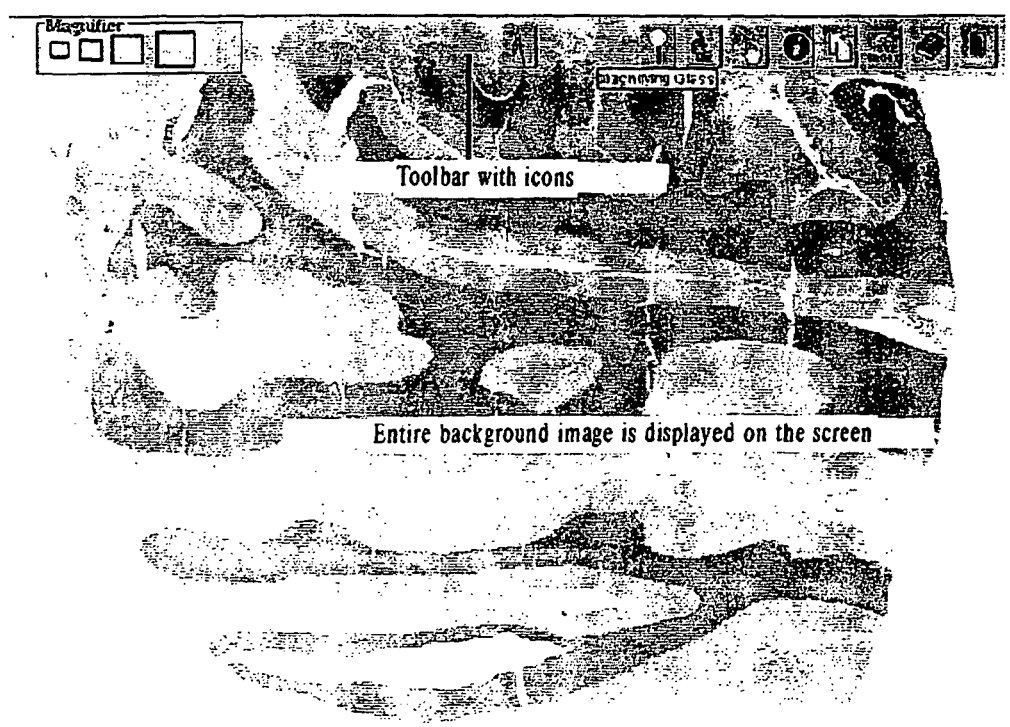
FIG. 6 is a screen view of the automatically hidden toolbar and its icons.

At this stage, the entire image is displayed on the monitor without any obstruction by other images, toolbars or dialogue windows. The toolbar, which is located across the top screen margin, is hidden out of sight automatically. An example tool bar is shown in FIG. 6.

The toolbar becomes visible only when the mouse moves to the upper margin of the screen. The icons in the toolbar are dynamically displayed, i.e. they appear only when the particular functions are relevant and available to the particular screen content. It appears whenever the mouse moves close to the upper border of the screen. Icons for all functions are located in the toolbar. By clicking on the icons in the toolbar, various functions are executed. This automatic hiding of the toolbar serves to maximize the displaying area of the images, ensuring the maximum clarity and the highest magnification possible. The toolbar itself is semitransparent, allowing the image underneath to show through.

Also in the toolbar is a button to call for related patient information and notes. Clicking on the button can display such data on the screen. There is also an "index" button for the users to go back to the virtual slide tray to select another image to exam. Should the users have any question in operating the program, a "help" button is also included in the toolbar. It can be toggled on and off by clicking this button, or the right mouse button from anywhere of the screen. A "tool-tip" will automatically appear when the mouse pauses over an icon for more than one second, providing a simple and clear explanation of the function of the icon in question.

7. Magnifying Glass Effect

There are three modes of image manipulation—two for viewing and one for measurement. The two viewing functions are the "magnifying glass effect" and the "microscope effect". These can be switched on and off by clicking on the corresponding icons in the toolbar. Clicking on the magnifying glass icon in the toolbar turns on this effect.

Figure 7:
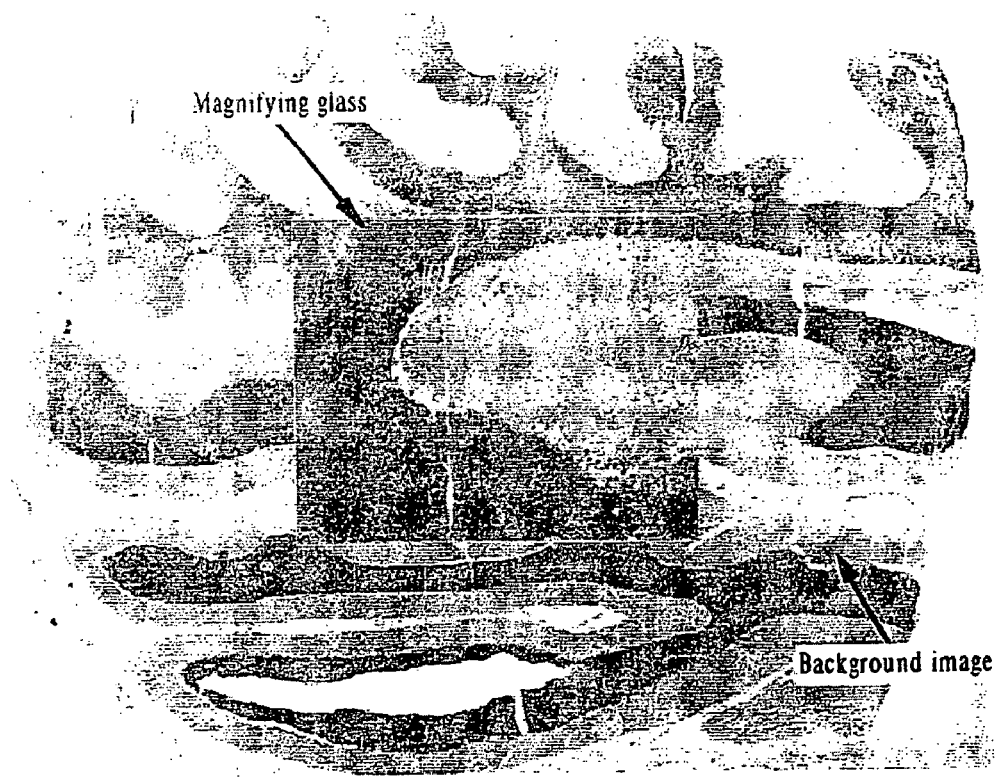
FIG. 7 is a screen view of the magnifying glass effect.

FIG. 7 shows an example screen for the magnifying glass. This may be the default mode and appears on the monitor when the image is first displayed on the screen but the magnifying glass itself is hidden. The "magnifying glass lens" can be moved around the screen with the mouse. Its magnifications can also be changed by clicking the up and down arrows in the toolbar. The enlarged images are always sharp.

The magnifying glass is a rectangle frame of about 300×200 pixels in size, and can be turned on and off by left clicking the mouse anywhere on the screen, or clicking on the icon of magnifying glass in the toolbar. The magnifying glass appears at the center of the screen as a rectangular shaped "lens", through which the image within the frame is enlarged by about 1.5-5 times from the background. Both the size of the magnifying glass and the degree of image enlargement within the frame can be adjusted by the users to a certain extent. The "magnifying glass lens" can be dragged around on the screen, allowing enlarged viewing of different areas of the background, in a way similar to viewing a detailed map with a hand hold magnifying glass, only that this magnifying glass lens can adjust its viewing size and magnifications. This function satisfies the need for the users to evaluate any region of the image at low magnifications.

The magnifying glass effect is achieved by using the Lingo language to manage the location and visibility of two layers of images, i.e. the larger version in the back and the identical but smaller version in the front, with another invisible layer called a "mask" in the middle. A mask layer enables the image beneath it to show through only partially from the white area. In this case, the white area has a rectangle shape to give the magnifying glass effect.

In the internal cast file, the large image should be positioned immediately after the "mask" layer. The size of the mask determines the size of the magnifying glass. The size of the large image is larger than the screen size. So when it is fit into the entire screen, the image shrinks in size. The magnifying glass can display a portion of the larger version of the same image located beneath the mask layer and use the center of the mask to dynamically align the foreground and background images to correctly display a changing area within the magnifying glass lens as it is dragged across the screen by the viewer. The size of the large, high-resolution images is used to limit the degree of magnification, so that even at the maximal magnification, the "enlarged" image is not distorted.

8. Microscope Effect

Figure 8:
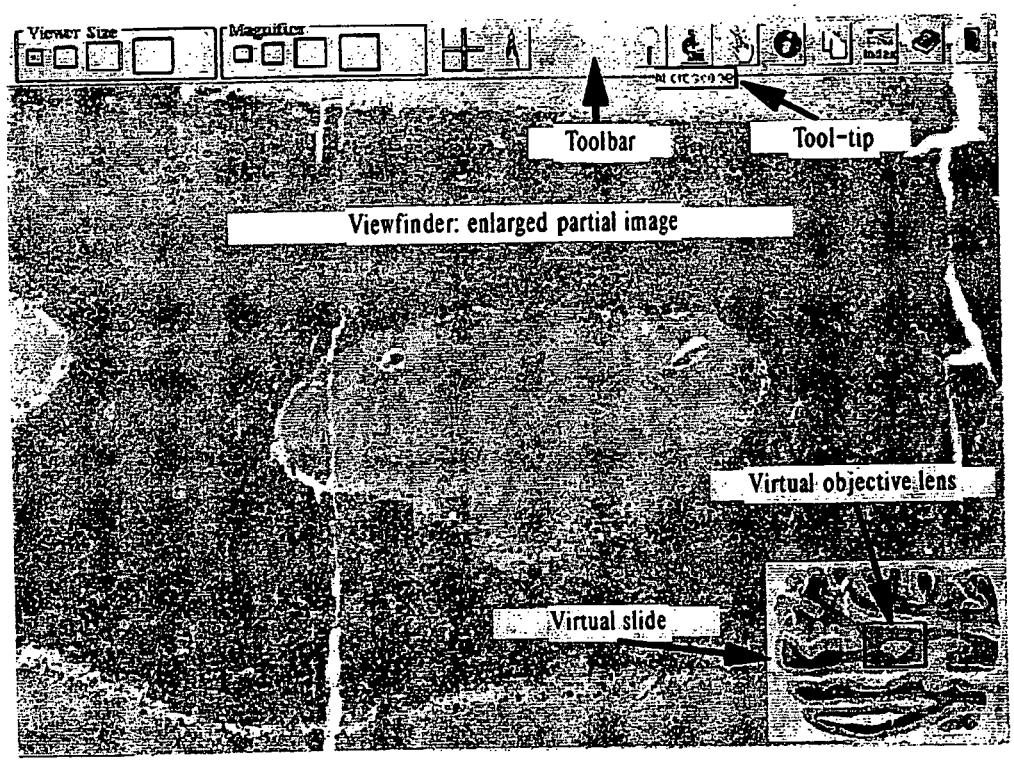
FIG. 8 is a screen view of the microscope effect.

Clicking on the microscope icon in the toolbar turns on the microscope effect. FIG. 8 shows an example screen of the microscope effect. The entire slide is now shrunk to the lower right corner of the screen to serve as the "virtual slide". An "objective lens" within the virtual slide is movable with the mouse.

The area within the small objective lens is enlarged and displayed dynamically on the entire screen. This function closely mimics the operation of a light microscope. This is the main viewing function of the VT program. At this mode, the entire image is displayed at the lower right corner of the screen as a smaller image map. This is the smaller copy of the larger, high-resolution image made by the VT program immediately after image retrieval.

The purpose of making this smaller image is to speed up the image loading process. This smaller image serves as a "virtual slide" containing the entire image, while a portion of the larger, high resolution image is displayed on the entire monitor screen as the viewfinder. Within the virtual slide (the smaller image), there is an even smaller, colored rectangular frame with a 2-pixel border. This frame serves as the objective lens. The image area that is encased inside the "objective lens" is enlarged and displayed on the entire screen.

The size of the objective lens can be changed by clicking on the up and down arrow or the prefixed objective lens size icons in the toolbar. The enlarged image of the area defined by the "objective lens" on the virtual slide fills the entire screen and changes magnifications accordingly. The objective lens can be dragged around within the small image (the virtual slide), and whatever area defined by the objective lens is then displayed instantly on the entire screen.

The smaller image, i.e. the virtual slide, can also be dragged around in the monitor and change sizes. By clicking on the "fixed location icon" in the toolbar, the virtual slide jumps to one of the four corners of the monitor screen, leaving most of the screen for viewing the enlarged area By clicking on any area outside of the virtual slide, the virtual slide is hidden, leaving the entire monitor free from obstruction for a clear view of the enlarged image of the selected area The virtual slide can appear anytime by clicking on the left button of the mouse again. This microscopic function, particularly the movement of the objective lens, changing magnifications of the image and the instantaneous displaying of the enlarged images of selective areas on the entire screen, permits further enlargement of the images and closely mimics the manner by which the users evaluate tissue sections on glass slides under a light microscope. When the high-resolution image contains the entire tissue section, this function enables the pathologists to view the entire image at will and offers them the freedom to exam any area of the entire tissue section at a range of magnifications. This affords the users the confidence and ease in operating the system as it functions similar to the traditional microscopic procedure.

The microscope effects are coded by Lingo computer language and image map of the Director 8.0 program. The location, size and movement of the virtual slide, the objective lens and the magnifying glass are continuously traced by identifying the pixel positions of the four-corner coordinates of the images and shapes at all times. In theory, the images can be enlarged indefinitely, but in reality, this is limited by the size of the large image and its ratio to the stage size. The data of the image size is detected at image retrieval, and then compared to the stage size to derive a ratio. This data is then used to restrain the maximum degree of magnification, so that the image would not be enlarged too much to distort the image, thus preserving the truthfulness of image at the highest magnification.

9. View linked images and relationship map

Figure 9:
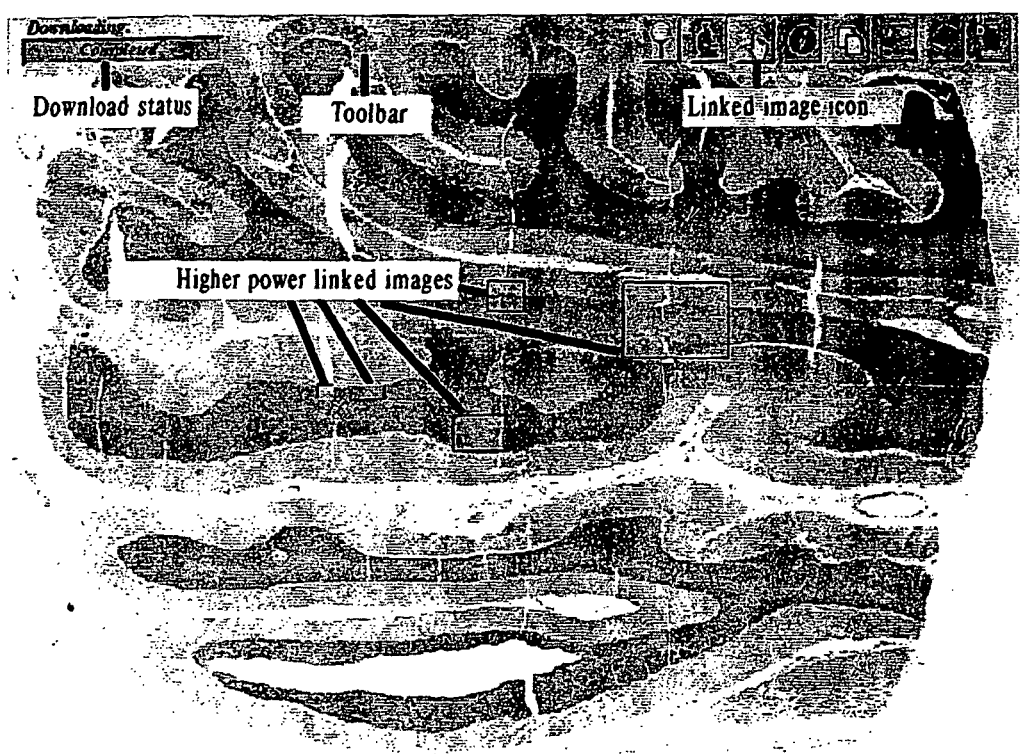
FIG. 9 is a screen view of the linked image map.

To view the linked higher-power images, one would click the "linked image" button in the toolbar, where it is displayed as a small open hand. The entire background image together with the linked images will be displayed on the screen. FIG. 9 shows an example screen of the linked image map. By selecting the "linked image" button in the toolbar, the viewer can review all the linked higher power images taken from different areas of the same specimen.

The linked image map displays the entire background image and the relative positions and sizes of all linked higher power images. By clicking on a linked image, the entire high power image will be displayed on the screen for close evaluation. The viewer can go back and forth to view different higher power images at will. This screen now displays the entire slide with available linked higher-power images displayed at different locations with different sizes, clearly illustrating the relationship among all the available images from one specimen. The linked images are first displayed as semitransparent yellow rectangle shadows.

Once the downloading of a linked image is completed, the yellow rectangle will have a red outline. This image can then be clicked to display the linked higher-power image on the entire screen. Once a linked image is displayed, functions of all the tools in the toolbar are still available to view the linked images. When finishing viewing this image, one click of the same "linked image" button will bring back the previous screen displaying the image relationship map. One can then select another higher-power image to display.

The feature of the linked image map allows the viewers to evaluate multiple images taken from the same glass slide at different magnifications in a logical and clear process. The entire slide and the linked higher-power images are organized and displayed in a meaningful manner. An example of the layout of the linked images and relationship map is presented in FIG. 4b. When finishing, the viewers can click the "Index" button in the toolbar, and this will bring back the virtual slide tray for the viewers to select another slide to view.

10. Image Analysis Function

Figure 10:
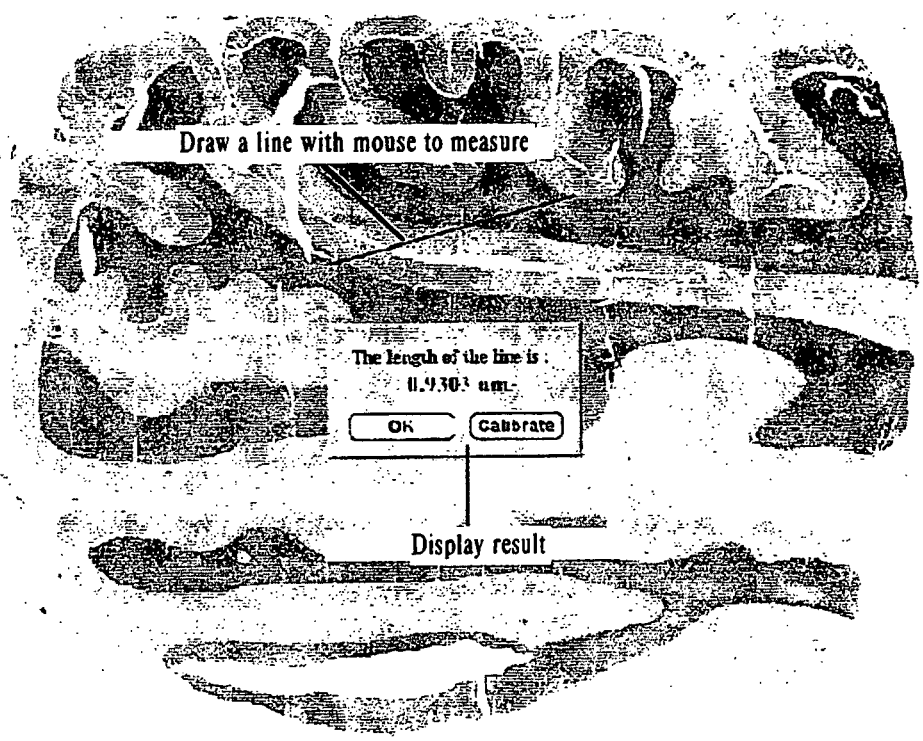
FIG. 10 is a screen view of the measurement function.
Figure 11A:
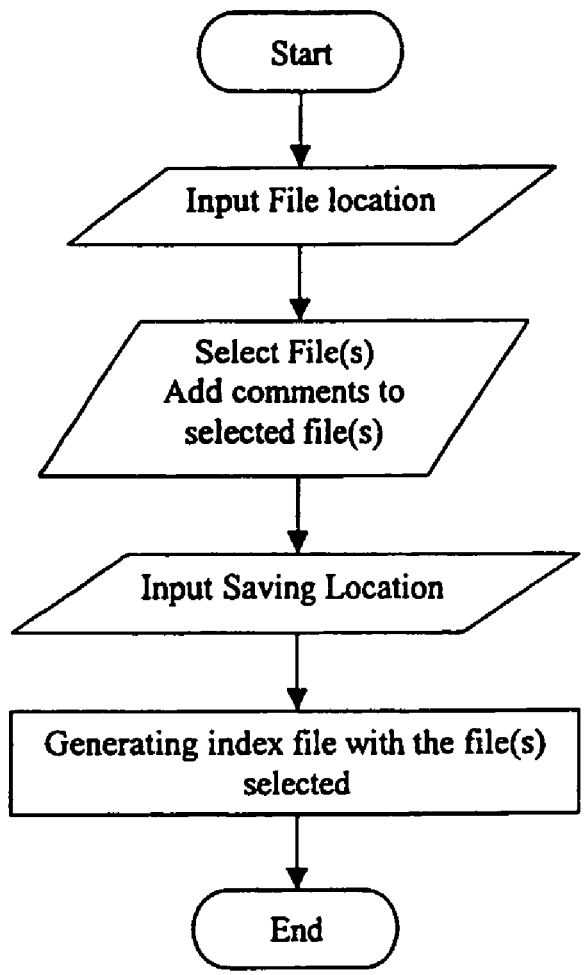
FIGS. 11a-11j are flowcharts of the major functions of the VT program.
Figure 11B:
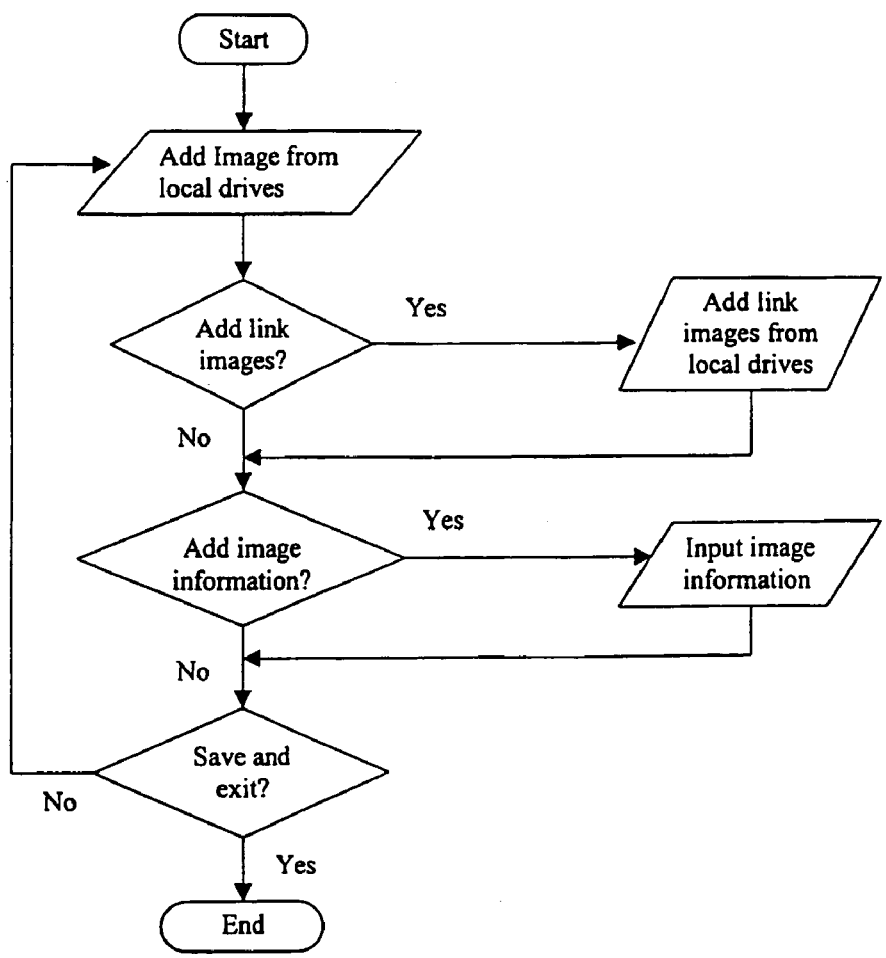
Figure 11C:
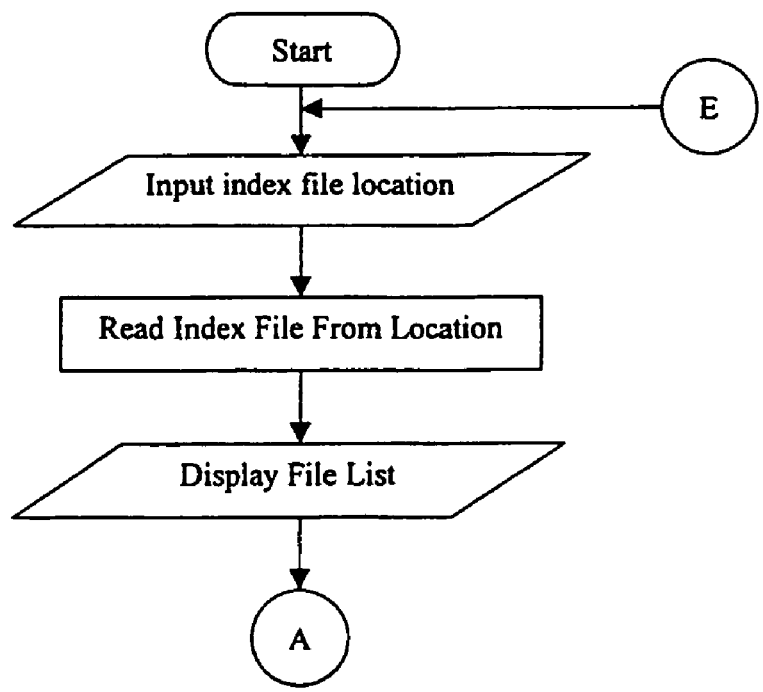
Figure 11D:
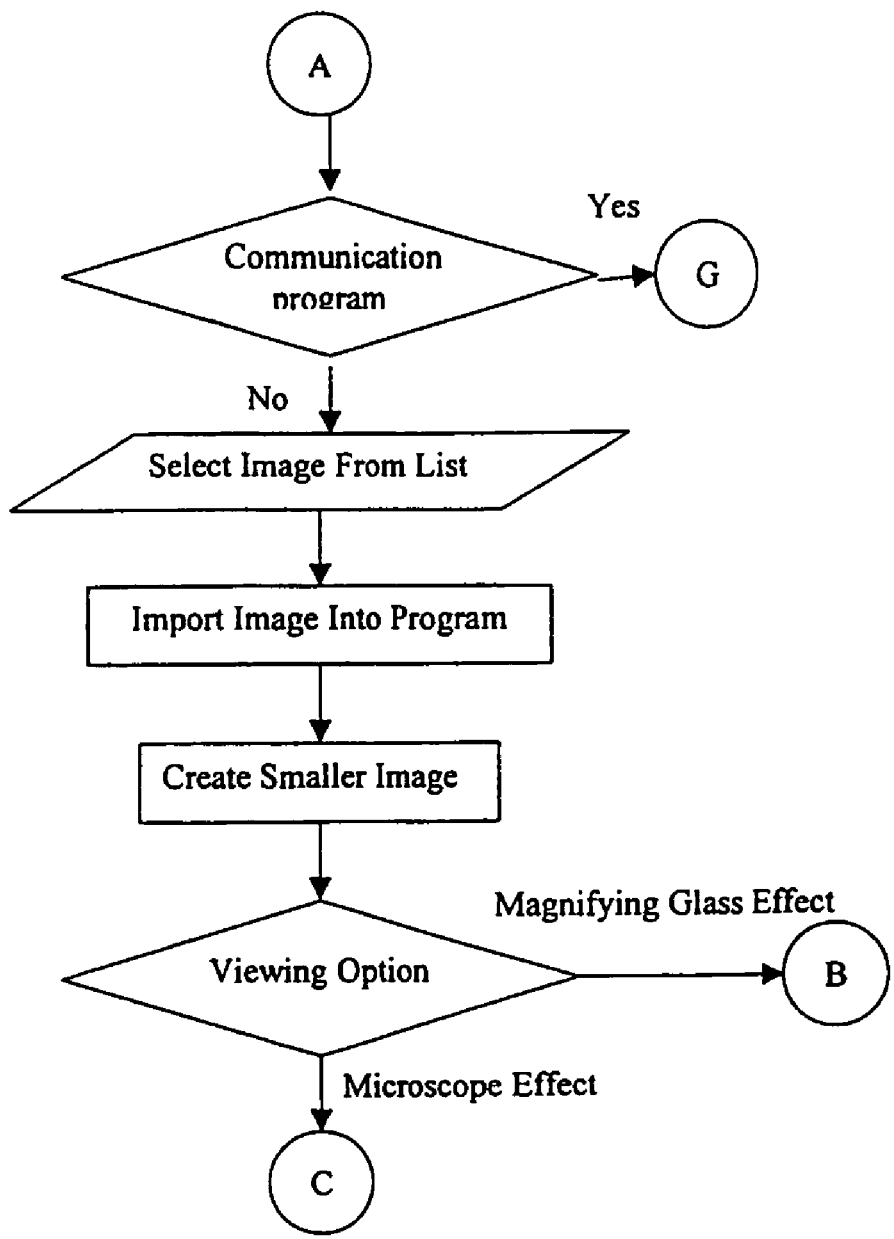
Figure 11E:
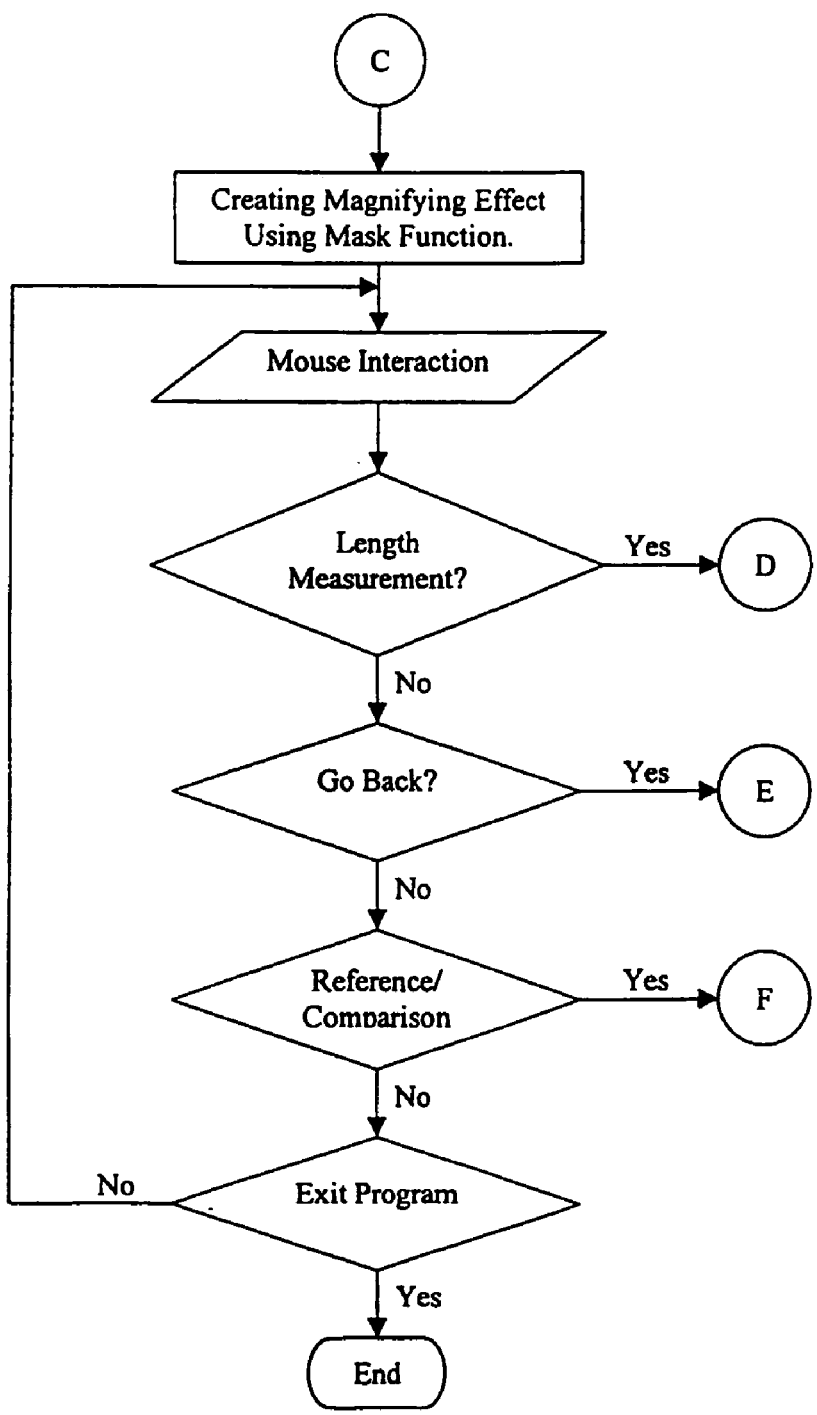
Figure 11F:
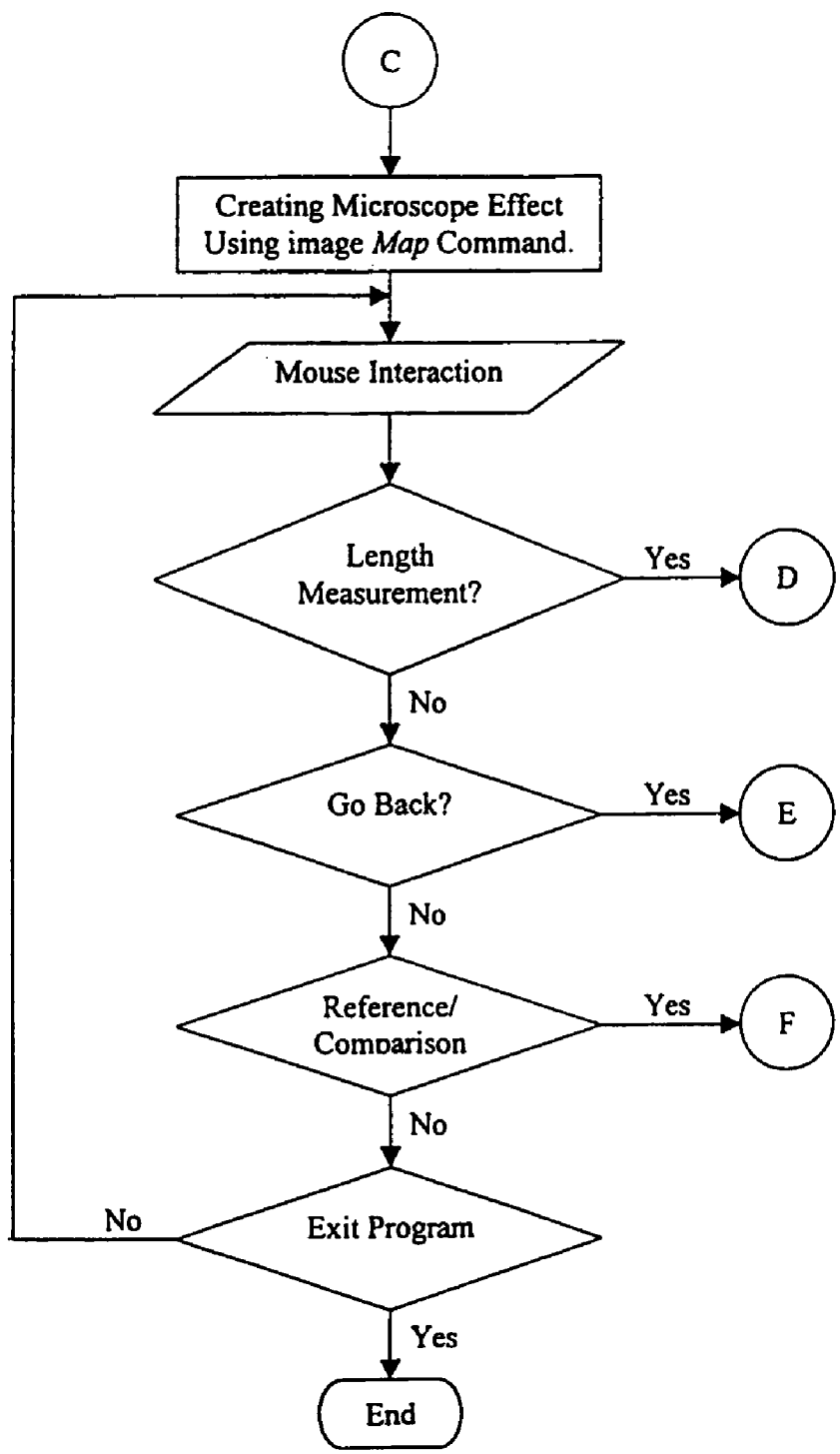
Figure 11G:
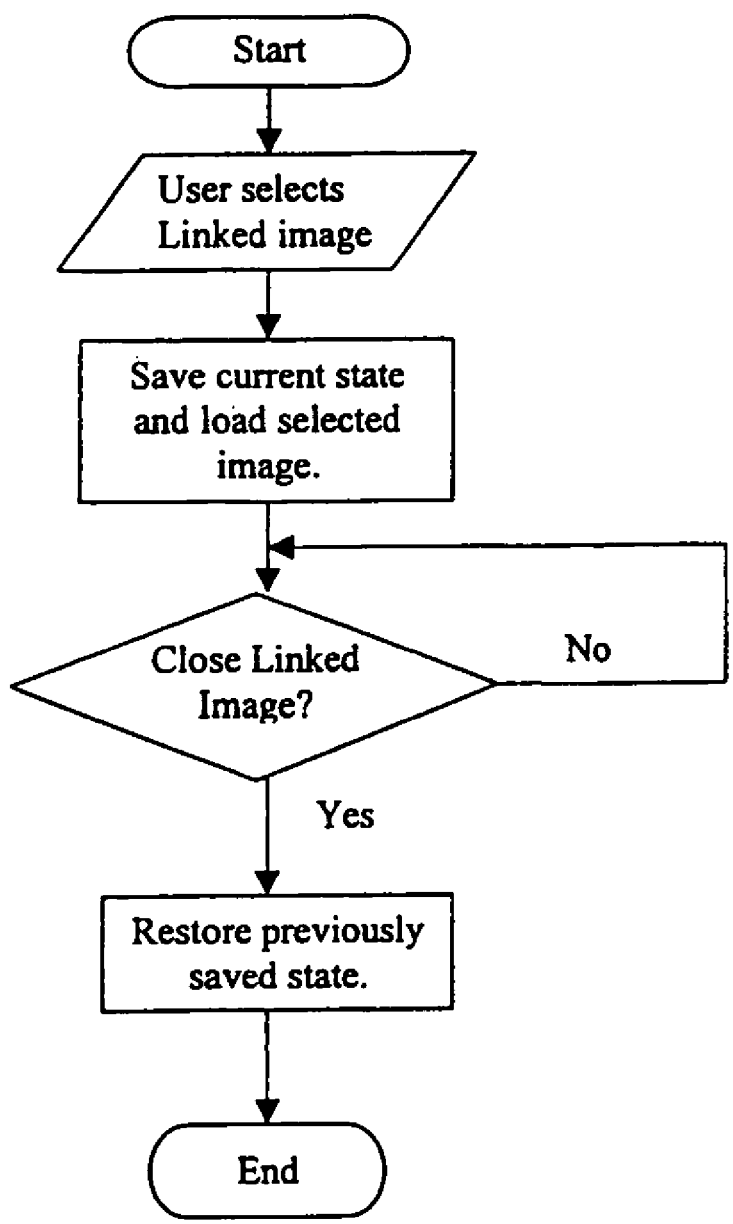
Figure 11H:
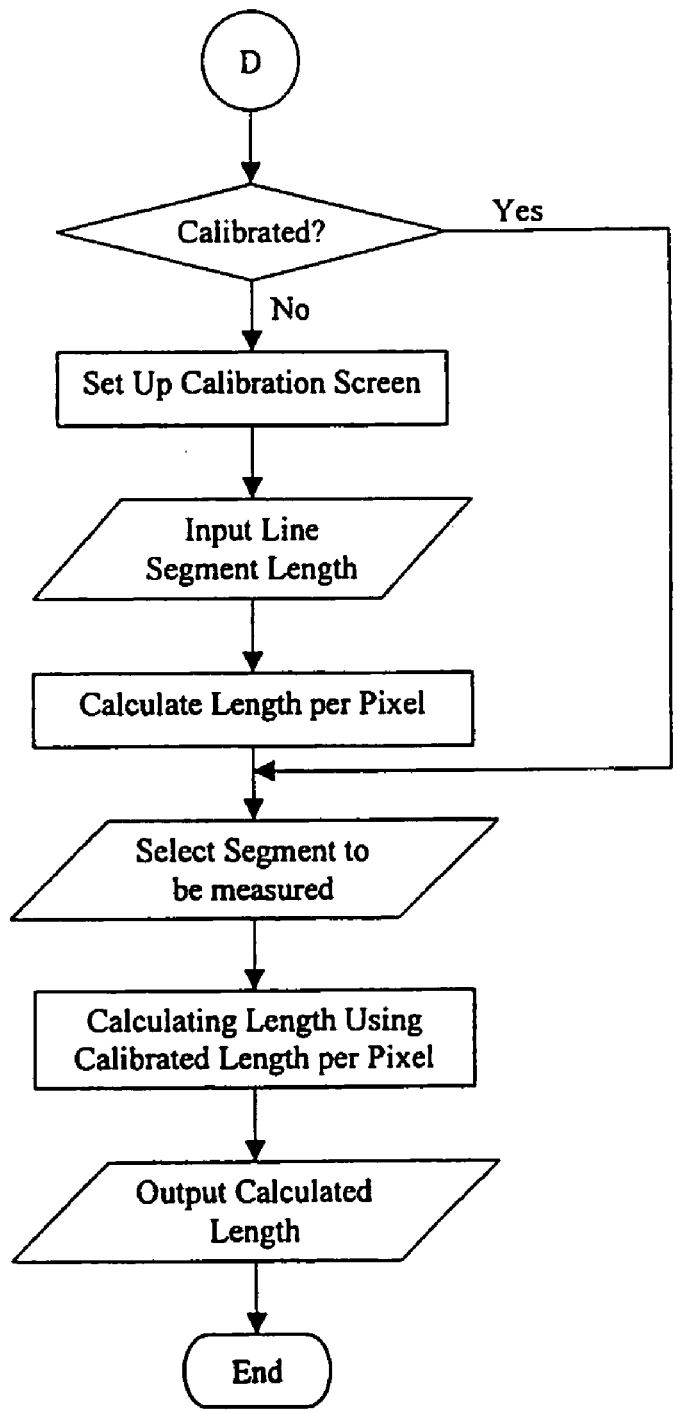
Figure 11I:
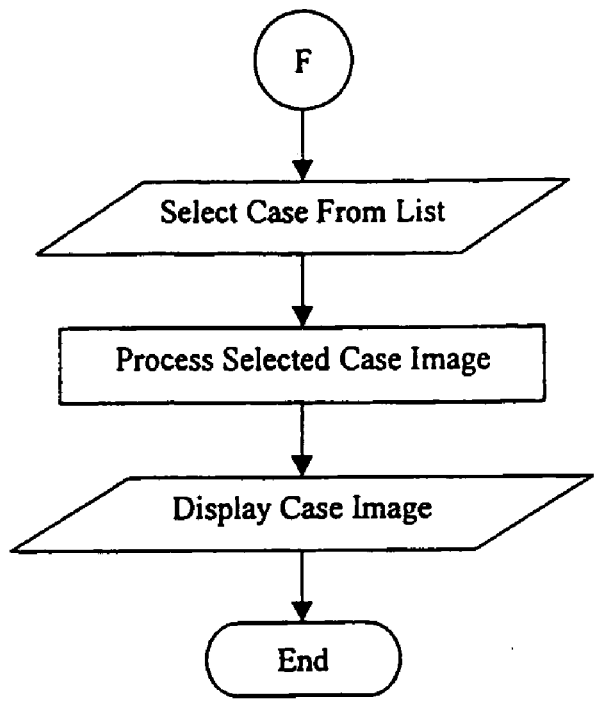
Figure 11J:
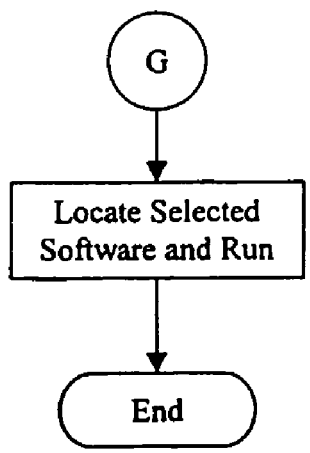

In addition to viewing the images, the VT system enables the users to directly measure the images on the monitor screen. FIG. 10 shows an example screen for the measurement function. By drawing a line between two points on the screen, the VT program will display the correct length of the measurement. When using specified slide scanner and digital camera, the measurement function is pre-calibrated. Otherwise, it needs to be calibrated when measuring each image.

In the measurement mode, the viewer first calibrates the measurement by drawing a line of any length across the screen and then entering its length and the unit. This is a necessary step as the images are captured at different magnifications at a remote site therefore a standardized unit for all cases is not possible. By defining the distance of two points on the screen, the program can establish a measurement unit for the particular image. This length unit is stored in the computer's memory for further measurements until it is reset. This calibration can be performed by drawing a line across the central dimension of a red blood cells or a neutrophil, which in human samples are known to have fixed lengths of about 7.5 um and 15 um respectively.

The calibration can be performed on any other structures on the image with a known distance. The calibration can also be established accurately by measuring particles of standard sizes incorporated into the tissue section, and/or scales engraved or incorporated on the tissue section or the glass slide. Once calibrated, the program will remember the information and use it in all subsequent measurements by recalculating the set value no matter what is the magnification of the image to be measured, until the next calibration is performed.

During calibration, the length and the unit entered by the user is correlated to the pixel information of the line on the screen. This data is then linked to the ratio between the real pixel of the image and the displayed image to take the magnification factor into consideration. The subsequent measurements are performed by multiplying the length of the new line in pixel with the basic unit per pixel established at calibration. This ensures accurate reading of the distance of any two points on the screen at any time at any magnifications of the original image.

This calibration step can be avoided if the user using a scanner with know resolution. The VT program assumes the user employs the recommended high-resolution scanner (Polaroid Sprint4000) with a resolution of 4000×4000 dpi, and has set the default calibration against this enlargement. The program can automatically detect the pixel size of the image, thereby calculate the unit length per pixel. When this scanner is used at this setting, or when a given microscope objective lens is used with fixed resolution, the default calibration will be accurate and used directly without going through the calibration process.

After calibration, to measure the size and distance of any two points on the image at any magnification, the user needs to draw a line with the mouse between any two points on the screen. The correct distance will be calculated and displayed instantly on the screen. Measurement can be repeated indefinitely until the user clicks any other button to exit the measurement mode.

11. Image Database and Instant Comparison

The VT system also contains an image database with commonly encountered pathological images. These images can be retrieved at any time and be compared with new images in question. This facilitates accurate and effective diagnostic, consulting and learning experience. The users can also enter their own collection of images for future references.

The reference image database does not have to be stored in the same computer where the user is retrieving images. It can be stored in any remote computer at any location as long as it is connected to the Internet. This allows different hospitals to utilize their specialties in setting up different reference image database for universal comparison and standardization.

12. Reporting and Feedback Function

Once the images are evaluated, the evaluator can communicate with the sender by a number of means, mostly built in the VT program. For example, an email function can be activated within the VT interphase using the computer's default email program. Other functions include videoconferencing, whiteboard image sharing, chat room, Internet phone, etc. These functions enable the sender and the receiver to communicate, and in particular, it allows the receiver to request more images at specified locations and magnifications other than those already provided by the sender.

Some of these functions are achieved through other commercially available software, with "buttons" within the VT program to access these functions. These other functions make the VT program a complete system for the purpose of conducting telepathology and effective exchange of data and information over the networks.

13. Other Applications

Overall, this system is a new concept using new processes and new technologies to accomplish the task of image transmission and evaluation. High-resolution static images are captured, processed and transmitted, but are viewed in an interactive and dynamic fashion. It is very easy to use, flexible, reliable and accurate. The entire system with this new process is much more affordable than any of the other available systems for the same or similar purpose.

This system can also be used to view high-resolution images of gross pathological specimens. The system would give consulting pathologists or on-call pathologists the freedom to render expert opinion on cases from distant locations. The VT system may be used to transmit and view X-ray and other medical images.

This program may create new image viewing capabilities. For example, the program may provide a bridge between the light and the electron microscopic (EM) images by shrinking and displaying a mosaic of EM images on the screen and reducing the magnification to the light microscopic level. The users can then zoom in to any region with the magnifying glass and microscope effects to examine the ultrastructural details without losing any resolution. This would allow the same preparation to be evaluated at both the light and the electron microscopic levels without changing samples or instruments.

With this system, images of gross specimen, light microscopic images and EM images can be bridged, linked and packaged together. The same specimen can be examined at different levels in a logical way with the linked image function. In addition, the VT program can be used to evaluate any high-resolution, large sized image that needs to be transmitted and viewed dynamically. Such applications may include microscopic examination of computer chips, analysis and close-up viewing of high-resolution satellite images, viewing large maps, measuring distances, and examining detailed photographs of any subject.

A special version of the VT program has been developed to perform morphologic exams for students, residents, etc. In this version, the administrator can set the source where the packaged images are retrieved. A timer can also be set for a time period during which the images will be available for viewing. This information is protected from the students. By clicking on the "start test" button, the timer will start and testing slides will appear on the screen. The students can then select the slides to review and answer relevant questions. When the set time is up, the program will stop and jump to a new screen for the student to exit.

This program has been used at the College of Medicine, University of South Alabama for teaching medical students. The responses have been overwhelmingly positive from the participating students and instructors.

14. Software

The VT program was developed using the multimedia programming Director 8.0 Shockwave Studio. It consists of a stage where the visible elements of the interface for the end users are placed. This is controlled by the backstage scores where the command sequences and relationship among different elements are arranged and displayed.

The individual elements (graphics, text, video, sound, scripts and other programming components) are called casts and are stored in cast libraries. Each cast number can be made into sprites and placed on the stage and/or the scores. Each sprite, cast number, frame or movie (the entire program is a collection of movies) can be further controlled by scripts using a programming language called Lingo. These commands instruct the behaviors of the sprites, the cast members, the frames and the movies. The end product of the program is packaged into an executable file called a projector, or a compressed file that can be run within an Internet browser called Shockwave movie. These standalone programs and files can be executed by the end users on any computer to perform the designed functions of the program.

The software code in Appendix A illustrates different aspects of this VT program. Page 1 of the Appendix is a printout of the internal cast members where most of the casts are stored. Pages 2-11 of the Appendix are the layout of the backstage scores where the design and arrangement of the sprites are illustrated. Because the score table is very large, it is printed on 11 pages and each page is a continuation from the previous one longitudinally (vertically). The correct sequences of the pages can be identified by the continuity of the channel numbers shown on the left column of the page and they should range from 1 to 300. Pages 12-35 of the Appendix contain a collection of the key script codes written with the Lingo language. Collectively, these documents illustrate the construction of this program.

Although illustrative embodiments of the present invention, and various modifications thereof, have been described in detail herein with reference to the accompanying drawings, it is to be understood that the invention is not limited to these precise embodiments and the described modifications, and that various changes and further modifications may be effected therein by one skilled in the art without departing from the scope or spirit of the invention as defined in the appended claims.

What is claimed is:

1. A method of using a computer system as a virtual telemicroscope that enables an interactive communication between a remote user and a service provider of the virtual telemicroscope, comprising:

capturing a first image corresponding to an entire area of a specimen with a digital image capturing device;

capturing at least one second image corresponding to a selected area of the first image, said second image having a higher magnification than the first image;

storing the first and second images in a computer-readable medium;

generating a linking information map indicating the regional relationship between said first and second images;

generating a virtual slide file by combining and compressing the first image, the second image and the linking information map;

transmitting the virtual slide file to the remote user in its entirety including the first image, the second image and the linking information; and receiving feedback information from the remote user requesting an additional image, wherein the feedback information from the remote user defines a specific area of the requested additional image on the entire area of the first image thereby enabling the service provider to take the requested additional image for transmission upon receiving the feedback information from the remote user.

2. The method of claim 1, wherein said capturing of second image is performed a plurality of times on different selected areas of the specimen, wherein the linking information map links the first image to each of the plurality of second images.

3. The method of claim 2, further comprising choosing a desired area of the first image for obtaining a corresponding magnified second image thereof after said generating of the linking information map.

4. The method of claim 3, wherein the linking information map facilitates the viewing of a desired area of the specimen by providing the appropriate second image linked to said desired area of the first image.

5. The method of claim 4, wherein said first and second images are stored in a similar format, wherein said format is one of JPG, GIF, TIF or BMP.

6. The method of claim 5, further comprising storing of the information map in said computer-readable medium.

7. The method of claim 6, wherein said computer-readable medium is one of computer hard drive, portable disk or CD.

8. The method of claim 6, wherein said computer-readable medium is a web server.

9. The method of claim 6, wherein the digital image capturing device is a digital camera.

10. The method of claim 6, wherein the digital image capturing device is a scanner.

11. The method of claim 4, wherein said first image is stored in a format chosen from a group consisting of JPG, GIF, TIF and BMP.

12. The method of claim 4, wherein said second image is stored in a format chosen from a group consisting of JPG, GIF, TIF and BMP.

13. The method according to claim 1, wherein an electronic mail system or other file transfer protocols (FTP) over the Internet is used for the transmitting image information in its entirety.

14. A method of using a computer system as a virtual telemicroscope that enables an interactive communication between a remote user and a service provider of the virtual telemicroscope, comprising:

capturing a background image corresponding to an entire area of a specimen with a digital image capturing device;

capturing a plurality of images corresponding to a selected area of the background image with a digital image capturing device, said images having different magnification levels;

generating a linking information map for said images of the specimen indicating relationships between said images of the selected area of the specimen;

storing said images and linking information map in a computer-readable medium, wherein the information map allows a user to view said selected area of the specimen under different magnification levels;

generating a virtual slide file by combining and compressing the background image, the plurality of images corresponding to a selected area of the background image and the linking information map;

transmitting the virtual slide file to the remote user in its entirety including the background image, the plurality of images corresponding to a selected area of the background image and the linking information; and receiving feedback information from the remote user requesting an additional image, wherein the feedback information from the remote user defines a specific area of the requested additional image on the entire area of the background image thereby enabling the service provider to take the requested additional image for transmission upon receiving the feedback information from the remote user.

15. The method of claim 14, wherein the linking information map facilitates viewing of a desired segment of the specimen by providing the appropriate image corresponding to the desired magnification level of said desired segment of said image.

16. The method of claim 15, further including posting the images and the information map to a network for allowing the remote user to access said images and said information map after said storing.

17. The method of claim 15, further including sending the images and the information map to the remote user via an e-mail or other file transfer protocols (FTP) for allowing the remote user to access said images and said linking information map after said storing.

18. The method of claim 15, wherein said images are stored in a similar format, wherein said format is one of JPG, GIF, TIF or BMP.

19. The method of claim 15, wherein the digital image capturing device is a digital camera.

20. The method of claim 15, wherein the digital image capturing device is a scanner.

21. A method of using a computer system as a virtual telemicroscope that enables an interactive communication between a remote user and a service provider of the virtual telemicroscope, comprising:

storing a captured first image of a specimen electronically, wherein the first image includes the entire specimen, said first image being captured with a digital image capturing device;

storing a captured second image of the specimen electronically, wherein the second image includes a smaller area of the specimen and has a higher magnification level than said first image, said second image being captured with a digital image capturing device;

generating an information map for linking said first image with said second image, wherein said information map allows a user to view a magnification of a selected area of said first image by uploading the appropriate second image that corresponds to said selected area;

generating a virtual slide file by combining and compressing the first image, the second image and the linking information map;

transmitting the virtual slide file to the remote user in its entirety including the first image, the second image and the information map for linking the first image with the second image; and receiving feedback information from the remote user requesting an additional image wherein the feedback information from the remote user defines a specific area of the requested additional image on the entire area of the first image thereby enabling the service provider to take the requested additional image for transmission upon receiving the feedback information from the remote user.

22. The method of claim 21, further including sending the images and the information map to a remote user via an e-mail for allowing the remote user to access said images and said information map after said storing.

23. The method of claim 21, wherein said first image and said second image are each stored in a similar format, wherein said format is one of JPG, GIF, TIF or BMP.

24. The method of claim 23, where said first image and said second image are stored on a computer-readable medium.

25. The method of claim 21, further including, compiling the information map, after said storing of said captured second image.

26. The method of claim 25, wherein the information map is stored on a computer-readable medium.

27. A method of using a computer system as a virtual telemicroscope that enables an interactive communication between a remote user and a service provider of the virtual telemicroscope, comprising:

receiving a location for an index file, said index file stored on a computer-readable medium;

retrieving said index file using the location, said index file listing a plurality of virtual slide files of different specimens, wherein each of said plurality of virtual slide files of different specimens is generated by combining and compressing an image of an entire specimen, images linked to the image of the entire specimen each having higher magnification levels than the image of the entire specimen and map information of the linked images;

displaying on the monitor screen of the remote user's computer system the listing of the plurality of virtual slide files of different specimens from the index file;

(d) receiving at least one of the plurality of image virtual slide files of different specimens in its entirety;

displaying dynamically the images of said at least one of the plurality of virtual slide files of different specimens allowing the remote user to view the specimen with different magnification levels of the specimen; and sending feedback information to the service provider requesting an additional image wherein the feedback information from the remote user defines a specific area of the requested additional image on the image of an entire specimen thereby enabling the service provider to take the requested additional image for transmission upon receiving the feedback information from the remote user.

28. The method of claim 27, wherein the location of said index file is selected from a group consisting of an Internet URL, a path of an intranet, and a local file.

29. The method of claim 27, wherein said displaying includes providing a tool bar on the monitor screen of the computer system for allowing the remote user to select different viewing and navigation options.

30. The method of claim 29, wherein said tool bar provides a magnifying means to view the specimen.

31. The method of claim 30, wherein said magnifying means magnifies the specimen between 1.5 and 5 times from the displayed image on the screen without losing resolution.

32. The method of claim 30, wherein said magnifying means comprises a movable virtual lens for allowing the remote user to adjust the magnification level and select the section of the specimen being magnified thereby dynamically displaying the magnified portion of the image on the entire screen.

33. The method of claim 32, wherein the movable virtual lens is a viewing window on a monitor of said computer system.

34. The method of claim 30, wherein said magnifying means is a virtual microscope with a virtual slide that allows the remote user to view the specimen, wherein said virtual microscope is provided with a virtual objective lens which is situated on top of said virtual slide thereby allowing the encased area within the virtual objective lens to be enlarged onto the entire monitor screen dynamically and allowing the remote user to adjust the magnification level.

35. The method of claim 34, wherein said virtual objective lens is movable on a monitor screen of said computer system to allow said objective lens to move around on said virtual slide thereby dynamically displaying the enlarged portion of the image on the entire screen.

36. The method of claim 34, the magnification capacity of said virtual objective lens is up to 200 from the original size of said specimen.

37. The method of claim 29, wherein said tool bar provides a measurement function thereby enabling the user to directly measure the images on the monitor screen.

38. The method of claim 37, wherein the measurement function enables the remote user to calibrate a measuring unit by referring to a known distance of the specimen thereby ensuring an accurate reading of distances on the monitor screen at any magnifications of the original image.

39. The method of claim 37, wherein said tool bar provides an image database linkage thereby enabling the user to compare the images instantly by retrieving the images from said database.

40. The method of claim 39, wherein said database is located remotely from the user's computer and connected to the user's computer through a computer network.

41. The method of claim 37, wherein said tool bar provides a text data association function thereby allowing the remote user to associate the text data to the images for a future reference.

42. The method of claim 27, further comprising receiving a communication request from the remote user to discuss the specimen with another user, said communication request received via a communication means.

43. The method of claim 42, wherein said communication means is selected from a group consisting of e-mail, video conferencing, whiteboard image sharing, chat room, and Internet telephony.

44. The method according to claim 27, wherein an electronic mail system over the Internet is used for the receiving at least one of the plurality of image files in its entirety.

45. A method of using a computer system as a virtual telemicroscope that enables an interactive communication between a remote user and a service provider of the virtual telemicroscope, comprising:
  capturing a plurality of images of a specimen, wherein the plurality of images include an image of an entire specimen and images of a plurality of segments of said entire specimen, wherein the images corresponding to said plurality of segments of said entire specimen have higher magnification levels;
  generating a linking map between said plurality of images wherein said linking map comprises information regarding geographical location of the images of a plurality of segments in relation to the specimen's structure;
  generating a virtual slide file by combining and compressing the image of an entire specimen, the images of a plurality of segments of said entire specimen and the linking map;
  transmitting, via a computer network, the virtual slide file to the remote user in its entirety including the image of the entire specimen, images of a plurality of segments of said entire specimen and linking map thereby allowing the remote user to view the images with different magnification levels mimicking a virtual slide; and
  receiving feedback information from the remote user requesting an additional image,
    wherein the feedback information from the remote user defines a specific area of the requested additional image on the image of an entire specimen thereby enabling the service provider to take the requested additional image for transmission upon receiving the feedback information from the remote user.

46. The method of claim 45, wherein said plurality of images are captured with a digital image capturing device.

47. The method of claim 46, further including storing said images and said linking map on an electronic medium.

48. The method of claim 47, wherein said transmitting comprises encrypting said images and said linking map.

49. The method of claim 48, wherein the computer network is selected from a group consisting of an Internet, intranet, and a local area network.

50. A system for using a computer system as a virtual telemicroscope that enables an interactive communication between a remote user and a service provider of the virtual telemicroscope, comprising:
  (a) a memory unit;
  (b) a processing unit in communication with said memory unit, wherein said processing unit is configured to:
    i. capture a first image corresponding to an entire area of a specimen;
    ii. capture at least one second image corresponding to a selected area of said first image, said second mage having a higher magnification than the first image;
    iii. store the first and second images in a computer-readable medium;
    iv. generate a linking information map indicating the regional relationship between said first and second images;
    v. generating a virtual slide file by combining and compressing the first image, the second image and the linking information map;
    vi. transmit the virtual slide file in its entirety including the first image, the second image and the linking information; and
    vii receiving feedback information from the remote user requesting an additional image,
      wherein the feedback information from the remote user defines a specific area of the requested additional image on the entire area of the first image thereby enabling the service provider to take the requested additional image for transmission upon receiving the feedback information from the remote user.

51. The system of claim 50, further comprising a digital image capturing device for capturing said first image and second image, said digital image capturing device in communication with said processor unit.

52. The system of claim 51, wherein said digital image capturing device is a digital camera.

53. The system of claim 51, wherein said digital image capturing device is a scanner.

54. The system according to claim 50, wherein an electronic mail system over the Internet is used to transmit image information in its entirety.

55. A system for using a computer system as a telemicroscope that enables an interactive communication between a remote user and a service provider of the virtual telemicroscope, comprising:
  a memory unit;
  a processing unit in communication with said memory unit, wherein said processing unit is configured to:
  receive a location for an index file, said index file stored on said memory unit;
  retrieve said index file using the location, said index file listing a plurality of virtual slide files of different specimens, wherein each of said plurality of virtual slide files of different specimens is generated by combining and compressing an image of an entire specimen, images linked to the image of the entire specimen each having a higher magnification levels than the image of the entire specimen and map information of the linked images;
  display on the monitor screen of the remote user's computer system the listing of the plurality of virtual slide files of different specimens from the index file;
  receive at least one of the plurality of virtual slide files of different specimens in its entirety;
  display the image of said first file and the image of said at least one of the plurality of virtual slide files of different specimens for allowing the remote user to view the specimen with different magnification levels of the specimen; and
  send feedback information to the service provider requesting an additional image,
    wherein the feedback information from the remote user defines a specific area of the requested additional image on the image of an entire specimen thereby enabling the service provider to take the requested additional image for transmission upon receiving the feedback information from the remote user.

56. The method according to claim 55, wherein an electronic mail system over the Internet is used to receive at least one of the plurality of image files in its entirety.

57. A system for using a computer system as a virtual telemicroscope that enables an interactive communication between a remote user and a service provider of the virtual telemicroscope, comprising:
 a memory unit;
 a processing unit in communication with said memory unit, wherein said processing unit is configured to:
  i. capture a plurality of images of a specimen, wherein the images correspond to the entire specimen and a plurality of segments of said specimen, wherein images corresponding to said plurality of segments have higher magnification levels;
  ii. generate a linking map between said images wherein said linking map comprises information regarding geographical location of the images in relation to the specimen's structure;
  iii. generating a virtual slide file by combining and compressing the image of an entire specimen, the images of a plurality of segments of said entire specimen and the linking map,
  vi transmit the virtual slide file to the remote user in its entirety including said images and said linking map to the remote user via a computer network thereby allowing the remote user to view the images with different magnification levels; and
  v. receiving feedback information from the remote user requesting an additional image,
   wherein the feedback information from the remote user defines a specific area of the requested additional image on the image of an entire specimen thereby enabling the service provider to take the requested additional image for transmission upon receiving the feedback information from the remote user.

58. A system for using a computer system as a virtual telemicroscope that enables an interactive communication between a remote user and a service provider of the virtual telemicroscope, comprising:
 (a) means for capturing a first image corresponding to an entire area of a specimen with a digital image capturing device;
 (b) means for capturing at least one second image corresponding to a selected area of the first image, said second image having a higher magnification than the first image;
 (c) means for storing the first and second images in a computer-readable medium;
 (d) means for generating a linking information map indicating the regional relationship between said first and second images;
 (e) means for generating a virtual slide by combining and compressing the first image, the second image and the linking map;
 (f) means for transmitting the virtual slide file to the remote user in its entirety including the first image, the second image and the linking information map; and
 (g) receiving feedback information from the remote user requesting an additional image,
  wherein the feedback information from the remote user defines a specific area of the requested additional image on the entire area of the first image thereby enabling the service provider to take the requested additional image for transmission upon receiving the feedback information from the remote user.

59. A system for using a computer system as a telemicroscope that enables an interactive communication between a remote user and a service provider of the virtual telemicroscope, comprising:
 (a) means for receiving a location for an index file, said index file stored on a computer-readable medium;
 (b) means for retrieving said index file using the location, said index file listing a plurality of virtual slide files of different specimens, wherein each of said plurality of virtual slide files of different specimens is generated by combining and compressing an image of an entire specimen, images linked to the image of the entire specimen each having higher magnification levels than the image of the entire specimen and map information of the linked images;
 (c) means for displaying on the screen of the remote user's computer system the listing of the plurality of virtual slide files of different specimens from the index file;
 (d) means for receiving at least one of the plurality of virtual slide files of different specimens in its entirety;
 (e) means for displaying the image of said at least one of the plurality of image files of different specimens for allowing the remote user to view the specimen with different magnification levels of the specimen; and
 (f) means for sending feedback information to the service provider requesting an additional image,
 wherein the feedback information from the remote user defines a specific area of the requested additional image on the image of an entire specimen thereby enabling the service provider to take the requested additional image for transmission upon receiving the feedback information from the remote user.

60. A system for using a computer system as a virtual telemicroscope that enables an interactive communication between a remote user and a service provider of the virtual telemicroscope, comprising:
 (a) means for capturing a plurality of images of a specimen, wherein the images correspond to the entire specimen and a plurality of segments of said specimen, wherein images corresponding to said plurality of segments have higher magnification levels;
 (b) means for generating a linking map between said images wherein said linking map comprises information regarding geographical location of the images in relation to the specimen's structure;
 (c) means for generating a virtual slide file by combining and compressing the image of an entire specimen, the image of a plurality of segments of said entire specimen and the linking map;
 (d) means for transmitting the virtual slide file to the remote user in its entirety including said images and said linking map to the remote user via a computer network thereby allowing the remote user to view the images with different magnification levels mimicking a virtual slide; and
 (e) means for receiving feedback information from the remote user requesting an additional image,
 wherein the feedback information from the remote user defines a specific area of the requested additional image on the image of an entire specimen thereby enabling the service provider to take the requested additional image for transmission upon receiving the feedback information from the remote user.

61. A computer-readable medium that stores instruction codes for a method of using a computer system as a virtual telemicroscope that enables an interactive communication between a remote user and a service provider of the virtual telemicroscope comprising:
(a) instruction code for capturing a first image corresponding to an entire area of a specimen with a digital image capturing device;
(b) instruction code for capturing at least one second image corresponding to a selected area of the first image, said second mage having a higher magnification than the first image;
(c) instruction code for storing the first and second images in a computer-readable medium;
(d) instruction code for generating a linking information map indicating the regional relationship between said first and second images;
(e) instruction code for generating a virtual slide file by combining and compressing the first image, the second image and the linking information map;
(f) instruction code for transmitting the virtual slide file to the remote user in its entirety including the first image, the second image and the linking information map; and
(g) instruction code for receiving feedback information from the remote user requesting an additional image, wherein the feedback information from the remote user defines a specific area of the requested additional image on the entire area of the first image thereby enabling the service provider to take the requested additional image for transmission upon receiving the feedback information from the remote user.

62. The computer-readable medium according to claim 61, wherein an electronic mail system over the Internet is used for the transmitting image information in its entirety.

63. A computer-readable medium that stores instruction codes for a method of using a computer system as a virtual telemicroscope that enables an interactive communication between a remote user and a service provider of the virtual telemicroscope, comprising:

(a) instruction code for receiving a location for an index file, said index file stored on a computer-readable medium;
(b) instruction code for retrieving said index file using the location, said index file listing a plurality of virtual slide files of different specimens, wherein each of said plurality of virtual slide files of different specimens is generated by combining and compressing an image of an entire specimen, images linked to the image of the entire specimen each having a higher magnification levels than the image of the entire specimen and map information of the linked images;
(c) instruction code for displaying the listing of the plurality of image virtual slide files of different specimens from the index file;
(d) instruction code for receiving at least one of the plurality of virtual slide files of different specimens in its entirety;
(e) instruction code for displaying the image of said at least one of the plurality of virtual slide files of different specimens for allowing the remote user to view the specimen with different magnification levels of the specimen; and
(f) instruction code for sending feedback information to the service provider requesting an additional image, wherein the feedback information from the remote user defines a specific area of the requested additional image on the image of an entire specimen thereby enabling the service provider to take the requested additional image for transmission upon receiving the feedback information from the remote user.

64. The method according to claim 63, wherein an electronic mail system over the Internet is used for the receiving at least one of the plurality of image files in its entirety.

* * * * *

UNITED STATES PATENT AND TRADEMARK OFFICE
CERTIFICATE OF CORRECTION

| | |
|---|---|
| PATENT NO. | : 7,292,251 B1 |
| APPLICATION NO. | : 10/089854 |
| DATED | : November 6, 2007 |
| INVENTOR(S) | : Gu et al. |

It is certified that error appears in the above-identified patent and that said Letters Patent is hereby corrected as shown below:

In Column 25, Line 11, change "mage" to --image--.

Signed and Sealed this

Eighth Day of April, 2008

JON W. DUDAS
*Director of the United States Patent and Trademark Office*